United States Patent
Rozbicki et al.

(10) Patent No.: US 10,969,645 B2
(45) Date of Patent: Apr. 6, 2021

(54) FASTER SWITCHING LOW-DEFECT ELECTROCHROMIC WINDOWS

(71) Applicant: View, Inc., Milpitas, CA (US)

(72) Inventors: Robert T. Rozbicki, Germantown, TN (US); Anshu A. Pradhan, Collierville, TN (US); Sridhar Karthik Kailasam, Fremont, CA (US); Robin Friedman, Sunnyvale, CA (US); Gordon E. Jack, Santa Clara, CA (US); Dane Thomas Gillaspie, Fremont, CA (US)

(73) Assignee: View, Inc., Milpitas, CA (US)

( * ) Notice: Subject to any disclaimer, the term of this patent is extended or adjusted under 35 U.S.C. 154(b) by 129 days.

(21) Appl. No.: 15/560,146

(22) PCT Filed: Mar. 18, 2016

(86) PCT No.: PCT/US2016/023293
§ 371 (c)(1),
(2) Date: Jan. 25, 2018

(87) PCT Pub. No.: WO2016/154064
PCT Pub. Date: Sep. 29, 2016

(65) Prior Publication Data
US 2018/0095337 A1 Apr. 5, 2018

Related U.S. Application Data

(60) Provisional application No. 62/136,354, filed on Mar. 20, 2015.

(51) Int. Cl.
*G02F 1/15* (2019.01)
*G02F 1/03* (2006.01)
(Continued)

(52) U.S. Cl.
CPC .............. *G02F 1/155* (2013.01); *G02F 1/1533* (2013.01); *G02F 2001/1536* (2013.01); *G02F 2201/501* (2013.01)

(58) Field of Classification Search
CPC ...... G02F 1/155; G02F 1/1523; G02F 1/1525; G02F 1/1521; G02F 1/1533; G02F 1/03;
(Continued)

(56) References Cited

U.S. PATENT DOCUMENTS

| 4,308,316 A | 12/1981 | Gordon |
| 4,419,386 A | 12/1983 | Gordon |

(Continued)

FOREIGN PATENT DOCUMENTS

| CN | 1739057 A | 2/2006 |
| CN | 102388340 A | 3/2012 |

(Continued)

OTHER PUBLICATIONS

U.S. Office Action for U.S. Appl. No. 13/763,505 dated May 23, 2014.
(Continued)

*Primary Examiner* — Dawayne Pinkney
(74) *Attorney, Agent, or Firm* — Weaver Austin Villeneuve & Sampson LLP; Brian D. Griedel

(57) ABSTRACT

Electrochromic devices comprise first and second conductors, wherein at least one of the first and second conductors is a multi-layered conductor. The electrochromic devices further comprise an electrochromic stack between the conductors adjacent to a substrate. The at least one multi-layered conductor comprises a metal layer sandwiched between a first non-metal layer and a second non-metal layer such that the metal layer does not contact the electrochromic stack.

11 Claims, 9 Drawing Sheets

(51) Int. Cl.
*G02F 1/01* (2006.01)
*G09G 3/19* (2006.01)
*G09G 3/38* (2006.01)
*H04N 9/16* (2006.01)
*G02F 1/155* (2006.01)
*G02F 1/153* (2006.01)

(58) Field of Classification Search
CPC .......... G02F 1/0316; G02F 3/16; G02F 1/163; C09K 9/02; B60R 1/088; H04N 9/3137; H04N 9/22
USPC ........ 359/265–275, 277, 245–247, 254, 242; 345/49, 105; 250/70; 348/817; 438/929
See application file for complete search history.

(56) References Cited

U.S. PATENT DOCUMENTS

| | | |
|---|---|---|
| 5,124,833 A | 6/1992 | Barton |
| 5,352,504 A | 10/1994 | Boulanger et al. |
| 5,699,192 A | 12/1997 | Van Dine et al. |
| 5,724,187 A * | 3/1998 | Varaprasad ............. B32B 17/06 359/265 |
| 6,094,292 A | 7/2000 | Goldner et al. |
| 6,770,176 B2 | 8/2004 | Benson et al. |
| 7,265,890 B1 | 9/2007 | Demiryont |
| 7,593,154 B2 | 9/2009 | Burdis et al. |
| 8,259,380 B2 | 9/2012 | Valentin et al. |
| 8,780,432 B1 | 7/2014 | Nguyen |
| 9,007,674 B2 | 4/2015 | Kailasam et al. |
| 9,229,291 B2 | 1/2016 | Kailasam et al. |
| 9,356,316 B2 | 5/2016 | Sun et al. |
| 9,408,303 B2 | 8/2016 | Hassan et al. |
| 9,921,421 B2 | 3/2018 | Branda et al. |
| 10,288,969 B2 | 5/2019 | Kailasam et al. |
| 10,303,032 B2 | 5/2019 | Brossard et al. |
| 10,788,723 B2 | 9/2020 | Rozbicki et al. |
| 2002/0149829 A1 | 10/2002 | Mochizuka et al. |
| 2003/0117066 A1 | 6/2003 | Silvernail |
| 2004/0121571 A1 | 6/2004 | Uchikoshi et al. |
| 2004/0123804 A1 | 7/2004 | Yamazaki et al. |
| 2005/0003737 A1 | 1/2005 | Montierth et al. |
| 2005/0082639 A1 | 4/2005 | Kikuta et al. |
| 2005/0195488 A1 | 9/2005 | McCabe et al. |
| 2006/0033978 A1 | 2/2006 | Morin et al. |
| 2006/0132885 A1 | 6/2006 | Pichot et al. |
| 2007/0097481 A1 | 5/2007 | Burdis et al. |
| 2007/0292606 A1 | 12/2007 | Demiryont |
| 2008/0018979 A1 | 1/2008 | Mahe et al. |
| 2008/0143906 A1 | 6/2008 | Allemand et al. |
| 2009/0067031 A1 | 3/2009 | Piroux et al. |
| 2009/0202743 A1 | 8/2009 | Schaepkens et al. |
| 2009/0296190 A1 | 12/2009 | Anderson et al. |
| 2010/0053722 A1 | 3/2010 | Finley et al. |
| 2010/0060971 A1 | 3/2010 | Schwendeman et al. |
| 2010/0079844 A1 | 4/2010 | Kurman et al. |
| 2010/0165440 A1 | 7/2010 | Nguyen et al. |
| 2010/0243427 A1 | 9/2010 | Kozlowski et al. |
| 2010/0245973 A1 | 9/2010 | Wang et al. |
| 2011/0080630 A1 | 4/2011 | Valentin et al. |
| 2011/0266138 A1 | 11/2011 | Wang et al. |
| 2011/0267673 A1 | 11/2011 | Agrawal et al. |
| 2011/0267674 A1 | 11/2011 | Wang et al. |
| 2012/0033287 A1 | 2/2012 | Friedman et al. |
| 2012/0038967 A1 | 2/2012 | Copeland et al. |
| 2012/0217346 A1 | 8/2012 | Eberle et al. |
| 2012/0275008 A1 | 11/2012 | Pradhan et al. |
| 2013/0107563 A1 | 5/2013 | McCabe et al. |
| 2013/0337603 A1 | 12/2013 | Steinhauser et al. |
| 2014/0022621 A1 | 1/2014 | Kailasam et al. |
| 2015/0131140 A1 | 5/2015 | Kailasam et al. |
| 2015/0253642 A1 | 9/2015 | Kalweit et al. |
| 2016/0141258 A1 | 5/2016 | Jain et al. |
| 2016/0209723 A1 | 7/2016 | Rozbicki |
| 2017/0219906 A1 | 8/2017 | Garcia et al. |
| 2017/0279155 A1 | 9/2017 | Sun et al. |
| 2019/0107764 A1 | 4/2019 | Kailasam et al. |
| 2019/0155120 A1 | 5/2019 | Li et al. |
| 2019/0219881 A1 | 7/2019 | Shrivastava et al. |
| 2019/0324341 A1 | 10/2019 | Tonar et al. |
| 2019/0331977 A1 | 10/2019 | Rozibicki et al. |
| 2020/0201132 A1 | 6/2020 | Kailasam et al. |
| 2020/0233278 A1 | 7/2020 | Kailasam |
| 2020/0379310 A1 | 12/2020 | Rozbicki et al. |
| 2021/0001426 A1 | 1/2021 | Dixit et al. |
| 2021/0018810 A1 | 1/2021 | Rozbicki et al. |

FOREIGN PATENT DOCUMENTS

| | | |
|---|---|---|
| EP | 0413580 A1 | 2/1991 |
| EP | 3617788 A1 | 3/2020 |
| JP | S58-163921 A | 9/1983 |
| JP | H07-028099 | 1/1995 |
| JP | 2007-108750 A | 4/2007 |
| JP | 2012-058515 A | 3/2012 |
| JP | 2012-523018 A | 9/2012 |
| JP | 2012-194412 | 10/2012 |
| JP | 2013-062133 A | 4/2013 |
| JP | 2013-149433 A | 8/2013 |
| KR | 10-2010-024174 | 3/2010 |
| KR | 10-2012-0007471 A | 1/2012 |
| TW | 282613 | 8/1996 |
| WO | WO94/15247 A1 | 7/1994 |
| WO | WO2004/026633 A2 | 4/2004 |
| WO | WO2006/014591 | 2/2006 |
| WO | WO2008/150851 A1 | 12/2008 |
| WO | WO2010/014648 A1 | 2/2010 |
| WO | WO2011/112882 A1 | 9/2011 |
| WO | WO2012/174260 | 12/2012 |
| WO | WO2014/099974 A1 | 6/2014 |
| WO | WO2014/152493 A1 | 9/2014 |
| WO | WO2016/029044 A1 | 2/2016 |
| WO | WO2016/126460 A2 | 8/2016 |
| WO | WO2016/154064 A1 | 9/2016 |
| WO | WO2017/192881 A1 | 11/2017 |
| WO | WO2018/039080 A1 | 3/2018 |
| WO | WO2019/178540 A1 | 9/2019 |

OTHER PUBLICATIONS

U.S. Notice of Allowance for U.S. Appl. No. 13/763,505 dated Oct. 23, 2014.
U.S. Notice of Allowance for U.S. Appl. No. 14/601,141 dated Sep. 25, 2015.
U.S. Office Action for U.S. Appl. No. 15/086,438 dated Jul. 27, 2017.
U.S. Final Office Action for U.S. Appl. No. 15/086,438 dated Feb. 9, 2018.
International Preliminary Report on Patentability dated Aug. 20, 2015, issued in PCT/US2014/015374.
International Search Report and Written Opinion dated Nov. 27, 2014, issued in PCT/US2014/015374.
Australian Examination Report dated Feb. 16, 2017 in AU Application No. 2014214738.
Australian Office Action dated Jun. 30, 2017 issued in AU Application No. 2014214738.
Chinese Office Aciton dated May 19, 2017 issued in CN Application No. 201480010617.X.
Extended European Search Report dated Aug. 12, 2016, issued in EP Application No. 14749144.3.
Russian Decision to Grant, including Search Report, dated Jan. 9, 2018 issued in RU Application No. 2015138108.
Taiwan Office Action dated Jul. 6, 2017 issued in TW Application No. 103104169.
International Preliminary Report on Patentability dated Oct. 5, 2017 issued in PCT/US16/23293.
International Search Report and Written Opinion dated Jul. 29, 2016 issued in PCT/US16/23293.
International Search Report and Written Opinion dated Dec. 13, 2017 in PCT/US2017/047664.

(56) References Cited

OTHER PUBLICATIONS

Abdullah, et al., The properties of ITO/arc-ZnO passivating layer for TCO conducting substrate deposited by RF magnetron sputtering, Advanced Materials Research, vol. 832, 2014, pp. 579-584.
Al Shakhs, M. et al., "Boosting the transparency of thin layers by coatings of opposing susceptibility: how metals help see through dielectrics," Scientific Reports (www.nature.com); 6:20659; DOI: 10.1038/srep20659, Feb. 10, 2016, 9 pp.
Crupi, I., et al., "Optimization of ZnO:Al/Ag/ZnO:Al structures for ultra-thin high-performance transparent conductive electrodes," vol. 520, No. 13, Apr. 30, 2012, pp. 4432-4435.
Filatova, E. O. et al., "Transparent-conductive-oxide (TCO) buffer layer effect on the resistive switching process in metal/TiO2/TCO/metal assemblies," New Journal of Physics 16 (2014) 113014.
Guillen, C. et al., "TCO/metal/TCO structures for energy and flexible electronics," Thin Solid Films 520, 2011, pp. 1-17.
Jager, T. et al., "Thin films of SnO2:F by reactive magnetron sputtering with rapid thermal post-annealing," vol. 553, Feb. 28, 2014, pp. 21-25.
Rubin, M., "Optical properties of soda lime silica glasses," Solar Energy Materials, vol. 12, No. 4, 1985, pp. 275-288.
Tvarusko, Aladar, "The electric resistivity of AgO," J. Electrochem. Soc. 1968 115(11), pp. 1105-1110.
Von Rottkay, K. et al, "Optical indices of pyrolytic tin-oxide glass," Mater. Res. Soc. Symp. Proc., vol. 426, 1996, 449, (LBNL Publication 38586), 7 pp.
Macleod, H.A., "Thin-film optical filters, 3rd Edition, (Chapter 15: Characteristics of thin-film dielectric materials)," 1986, Bristol, UK, pp. 622-627.
U.S. Notice of Allowance for U.S. Appl. No. 15/086,438 dated Dec. 28, 2018.
Australian Examination Report dated Jul. 10, 2018 in AU Application No. 2017204525.
Chinese Office Aciton dated Feb. 2, 2018 issued in CN Application No. 201480010617.X.
European Office Action dated Jan. 22, 2019 in EP Application No. 14749144.3.
European Search Report dated Aug. 21, 2019 in EP Application No. 19183372.2.
European Office Action dated Sep. 5, 2019 in EP Application No. 19183372.2.
Indian Office Action dated Oct. 30, 2019 in IN Application No. 2583/KOLNP/2015.
Extended European Search Report dated Oct. 19, 2018 in EP Application No. 16769458.7.
International Preliminary Report on Patentability dated Mar. 7, 2019 in PCT/US2017/047664.
International Search Report and Written Opinion dated May 24, 2019 in PCT/US19/22580.
U.S. Office Action for U.S. Appl. No. 16/209,514 dated Mar. 18, 2020.
U.S. Office Action for U.S. Appl. No. 16/509,189 dated Mar. 13, 2020.
U.S. Notice of Allowance for U.S. Appl. No. 16/509,189 dated Jul. 8, 2020.
Canadian Office Action dated Feb. 24, 2020 issued in CA Application No. 2,899,607.
European Office Action dated Feb. 28, 2020 in EP Application No. 19183372.2.
Korean Office Action dated Mar. 5, 2020 in KR Application No. 10-2015-7022800.
Chinese Office Action dated Apr. 9, 2020 in CN Application No. 201680023096.0.
EP Extended Search Report dated Feb. 25, 2020 in EP Application No. 17844188.7.
U.S. Office Action for U.S. Appl. No. 16/327,789 dated Sep. 28, 2020.
European Office Action dated Aug. 20, 2020 in EP Application No. 19183372.2.
International Preliminary Report on Patentability dated Oct. 6, 2020 in PCT/US19/22580 .
U.S. Appl. No. 16/947,757, filed Aug. 14, 2020, Rozbicki et al.
U.S. Appl. No. 16/981,600, filed Sep. 16, 2020, Rozbicki et al.
Canadian Office Action dated Nov. 12, 2020 issued in CA Application No. 2,899,607.
U.S. Final Office Action for U.S. Appl. No. 16/209,514 dated Nov. 25, 2020.
Korean Office Action dated Dec. 11, 2020 in KR Application No. 10-2015-7022800.
U.S. Notice of Allowance for U.S. Appl. No. 16/327,789 dated Feb. 4, 2021.
Chinese Office Action dated Dec. 23, 2020 issued in CN Application No. 201811008514.6.
Korean Notice of Refusal dated Dec. 1, 2020 in KR Application No. 10-2015-7022800.
Taiwan Office Action dated Jan. 25, 2021 issued in TW Application No. 106128249.

* cited by examiner

FASTER SWITCHING LOW-DEFECT ELECTROCHROMIC WINDOWS

CROSS-REFERENCE TO RELATED APPLICATIONS

This is a national stage application under 35 U.S.C. § 371 to International PCT application PCT/US16/23293 (designating the United States), filed on Mar. 18, 2016 and titled, "FASTER SWITCHING LOW-DEFECT ELECTROCHROMIC WINDOWS," which claims priority to and benefit of U.S. Provisional Application No. 62/136,354, titled "FASTER SWITCHING LOW-DEFECT ELECTROCHROMIC WINDOWS" and filed on Mar. 20, 2015; each of which is hereby incorporated by reference in its entirety and for all purposes.

FIELD

The disclosure generally relates to electrochromic devices and in particular to material layers in electrochromic devices.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. Electrochromic materials may be incorporated into, for example, windows and mirrors. The color, transmittance, absorbance, and/or reflectance of such windows and mirrors may be changed by inducing a change in the electrochromic material. However, advances in electrochromic technology, apparatus, and related methods of making and/or using them, are needed because conventional electrochromic windows suffer from, for example, high defectivity and low versatility.

SUMMARY

Certain embodiments pertain to electrochromic devices comprising first and second conductors, wherein at least one of the first and second conductors is a multi-layered conductor. The electrochromic devices further comprising an electrochromic stack between the conductors adjacent a substrate. The at least one multi-layer conductor comprises a metal layer sandwiched between a first non-metal layer and a second non-metal layer such that the metal layer does not contact the electrochromic stack.

Certain embodiments pertain to electrochromic devices comprising in the following order: a) a glass substrate, b) a first TCO layer, c) a first defect mitigating insulating layer, d) a first metal layer, e) a second defect mitigating insulating layer, f) an EC stack comprising a cathodically coloring electrode layer and an anodically coloring electrode layer sandwiching an ion conductor layer, g) a second TCO layer, h) a second metal layer, and i) a third TCO layer.

Certain embodiments pertain to an electrochromic device comprising, in the following order, a substantially transparent substrate, a first multi-layer conductor disposed on the substantially transparent substrate. The first multi-layer conductor comprises, in order, a first conductive material layer, a first defect mitigating insulating layer, a second conductive material layer, and a second defect mitigating insulating layer. The electrochromic device further comprising an electrochromic stack and a second multi-layer conductor disposed on the electrochromic stack. The second multi-layer conductor comprises, in order, a third defect mitigating insulating layer, a third conductive material layer, a fourth defect mitigating insulating layer, and a fourth conductive material layer.

Certain embodiments pertain to an electrochromic device comprising, in the following order, a substantially transparent substrate and a first multi-layer conductor disposed on the substantially transparent substrate. The first multi-layer conductor comprises, in order, a first transparent conductive oxide layer, a first metal layer, a second transparent conductive oxide layer, and a first defect mitigating insulating layer. The electrochromic device further comprises an electrochromic stack and a second multi-layer conductor disposed on the electrochromic stack. The second multi-layer conductor comprises, in order, a third transparent conductive oxide layer, a second metal layer, and a fourth transparent conductive oxide layer.

Certain embodiments pertain to An electrochromic device comprising, in the following order a substantially transparent substrate and a first multi-layer conductor disposed on the substantially transparent substrate. The first multi-layer conductor comprising, in order, a first transparent conductive oxide layer, a first metal layer, a second transparent conductive oxide layer, one or more blocking layers, a first defect mitigating insulating layer. The electrochromic device further comprising an electrochromic stack and a second multi-layer conductor disposed on the electrochromic stack, the second multi-layer conductor comprising, in order, a third transparent conductive oxide layer, a second metal layer, and a fourth transparent conductive oxide layer.

Certain embodiments pertain to An electrochromic device comprising, in the following order a substantially transparent substrate and a first multi-layer conductor disposed on the substantially transparent substrate. The first multi-layer conductor comprises, in order, a first transparent conductive oxide layer, a first metal layer, a protective cap layer, and a second transparent conductive oxide layer. The electrochromic device further comprises an electrochromic stack and a second multi-layer conductor disposed on the electrochromic stack. The second multi-layer conductor comprises, in order, a third transparent conductive oxide layer, a second metal layer, and a fourth transparent conductive oxide layer.

These and other features and embodiments will be described in more detail below with reference to the drawings.

DETAILED DESCRIPTION

Certain aspects pertain to electrochromic devices configured not only for faster switching, but also for high quality low-defect count. In some cases, the electrochromic devices have multi-layer conductors of differing materials. The different conductor material layers are configured for faster switching relative to conventional single-layer conductors, while also being optically and materially compatible with the other device layers. In other aspects, electrochromic devices are configured with one or more barrier/blocking layer and/or one or more metal alloy layers to help prevent migration of the metal into the electrochromic device for improved durability. These and other aspects are described below.

I. Electrochromic Device Structure

Before turning to a more detailed description on conductor designs and other improvements in layers of an electrochromic device, examples of the structure of an electrochromic device are provided. An electrochromic device generally comprises two conductors that sandwich an electrochromic stack. The electrochromic stack typically includes an electrochromic (EC) layer, a counter electrode (CE) layer, and optionally one or more ion conducting (IC) layers that allow ion transport but are electrically insulating. Electrochromic devices are typically deposited on a substrate, and oftentimes are depicted as fabricated on a horizontally oriented substrate, and thus for the purposes of this disclosure, the conductors of the electrochromic device are sometimes referred to as "upper" and "lower" conductors where the description makes reference to drawings that depict the conductors in this manner. In other cases, the conductors are referred to as "first" and "second" conductors.

Figure 1:
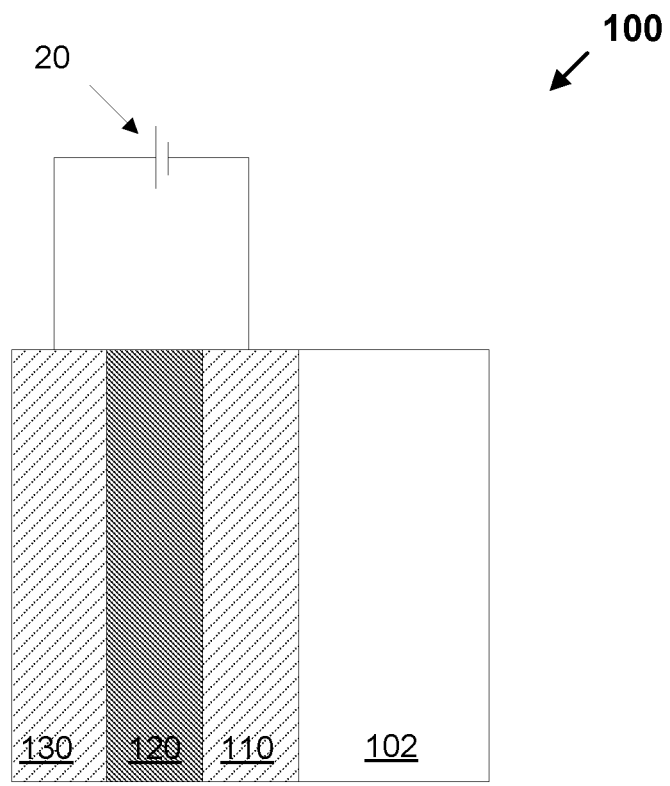
FIG. 1 depicts a schematic illustration of a cross section of an electrochromic device, according to aspects.

FIG. 1 is a schematic illustration of a cross-section of an electrochromic device 100, according to embodiments. The electrochromic device 100 comprises a substrate 102 (e.g., glass), a first conductor 110, an electrochromic stack 120, and a second conductor 130. A voltage source, 20, operable to apply an electric potential across electrochromic stack 120 effects the transition of the electrochromic device 100 between tint states such as, for example, between a bleached state and a colored state. In certain implementations, the electrochromic device 100 further comprises a diffusion barrier of one or more layers between the substrate 102 and the first conductor 110. In some cases, the substrate 102 may be fabricated with the diffusion barrier.

In certain embodiments, the electrochromic stack is a three-layer stack including an EC layer, optional IC layer that allows ion transport but is electrically insulating, and a CE layer. The EC and CE layers sandwich the IC layer. Oftentimes, but not necessarily, the EC layer is tungsten oxide based and the CE layer is nickel oxide based, e.g., being cathodically and anodically coloring, respectively. In one embodiment, the electrochromic stack is between about 100 nm and about 500 nm thick. In another embodiment, the electrochromic stack is between about 410 nm and about 600 nm thick. For example, the EC stack may include an electrochromic layer that is between about 200 nm and about 250 nm thick, an IC layer that is between about 10 and about 50 nm thick, and a CE layer that is between about 200 nm and 300 nm thick.

Figure 2A:
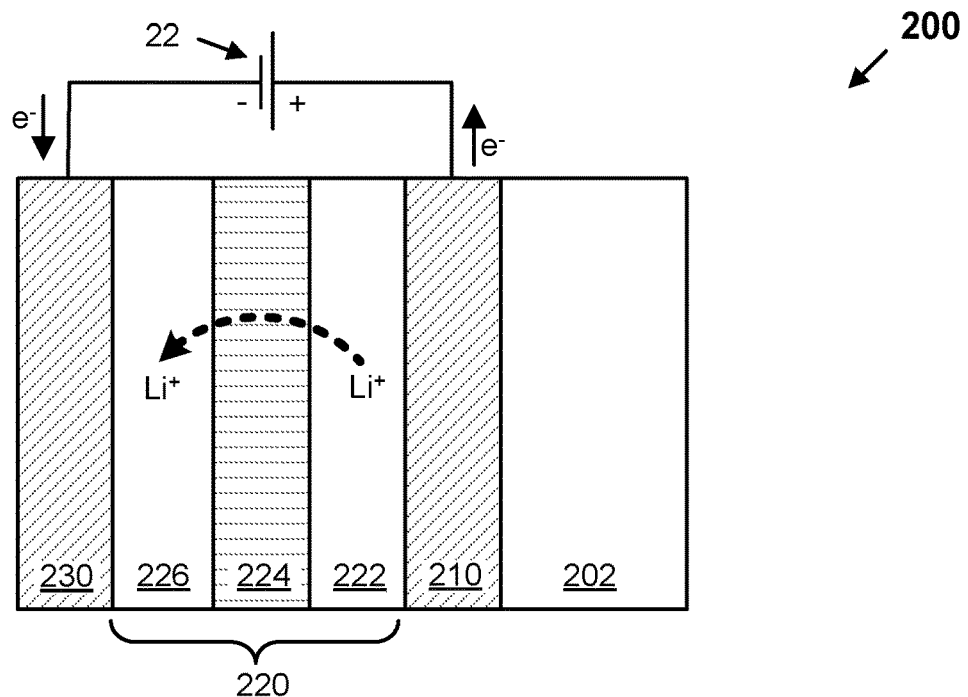
FIGS. 2A and 2B depict schematic illustrations of a cross section of an electrochromic device, according to certain aspects.
Figure 2B:
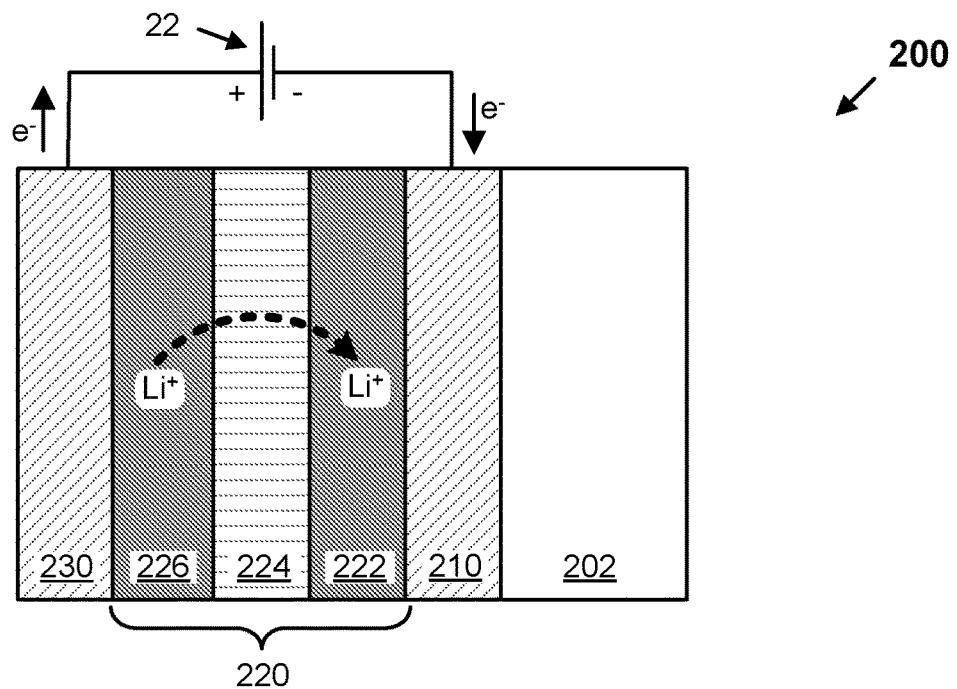

FIGS. 2A and 2B are schematic cross-sections of an electrochromic device 200, according to embodiments. The electrochromic device 200 comprises a substrate 202, a first conductor 210, an electrochromic stack 220, and a second conductor 230. The electrochromic stack 220 comprises an electrochromic layer (EC) 222, an optional ion conducting (electronically resistive) layer (IC) 224, and a counter electrode layer (CE) 226. A voltage source 22 is operable to apply a voltage potential across the electrochromic stack 220 to effect transition of the electrochromic device between tint states such as, for example, between a bleached state (refer to FIG. 2A) and a colored state (refer to FIG. 2B). In certain implementations, the electrochromic device 200 further comprises a diffusion barrier located between the substrate 202 and the first conductor 210.

In certain implementations of the electrochromic device 200 of FIGS. 2A and 2B, the order of layers in the electrochromic stack 220 may be reversed with respect to the substrate 202 and/or the position of the first and second conductors may be switched. For example, in one implementation the layers may be in the following order: substrate 202, second conductor 230, CE layer 226, optional IC layer 224, EC layer 222, and first conductor 210.

In certain implementations, the CE layer may include a material that is electrochromic or not. If both the EC layer and the CE layer employ electrochromic materials, one of them is a cathodically coloring material and the other an anodically coloring material. For example, the EC layer may employ a cathodically coloring material and the CE layer may employ an anodically coloring material. This is the case when the EC layer is a tungsten oxide and the counter electrode layer is a nickel tungsten oxide. The nickel tungsten oxide may be doped with another metal such as tin, niobium or tantalum.

During an exemplary operation of an electrochromic device (e.g. electrochromic device 100 or electrochromic device 200), the electrochromic device can reversibly cycle between a bleached state and a colored state. For simplicity, this operation is described in terms of the electrochromic device 200 shown in FIGS. 2A and 2B, but applies to other electrochromic devices described herein as well. As depicted in FIG. 2A, in the bleached state, a voltage is applied by the voltage source 22 at the first conductor 210 and second conductor 230 to apply a voltage potential across the electrochromic stack 220, which causes available ions (e.g. lithium ions) in the stack to reside primarily in the CE layer 226. If the EC layer 222 contains a cathodically coloring material, the device is in a bleached state. In certain electrochromic devices, when loaded with the available ions, the CE layer can be thought of as an ion storage layer. Referring to FIG. 2B, when the voltage potential across the electrochromic stack 220 is reversed, the ions are transported across optional IC layer 224 to the EC layer 222, which causes the material to transition to the colored state. Again, this assumes that the optically reversible material in the electrochromic device is a cathodically coloring electrochromic material. In certain embodiments, the depletion of ions from the counter electrode material causes it to color also as depicted. In other words, the counter electrode material is anodically coloring electrochromic material. Thus, the EC layer 222 and the CE layer 226 combine to synergistically reduce the amount of light transmitted through the stack. When a reverse voltage is applied to the electrochromic device 200, ions travel from the EC layer 222, through the IC layer 224, and back into the CE layer 226. As a result, the electrochromic device 200 bleaches i.e. transitions to the bleached states. In certain implementations, electrochromic devices can operate to transition not only between bleached and colored states, but also to one or more intermediate tint states between the bleached and colored states.

Some pertinent examples of electrochromic devices are presented in the following US patent applications, each of which is hereby incorporated by reference in its entirety: U.S. patent application Ser. No. 12/645,111, filed on Dec. 22, 2009; U.S. patent application Ser. No. 12/772,055, filed on Apr. 30, 2010; U.S. patent application Ser. No. 12/645,159, filed on Dec. 22, 2009; U.S. patent application Ser. No. 12/814,279, filed on Jun. 11, 2010; and U.S. patent application Ser. No. 13/462,725, filed on May 2, 2012.

Electrochromic devices such as those described with reference to FIGS. 1, 2A and 2B can be incorporated, for example, in electrochromic windows. In these examples, the substrate is a transparent or substantially transparent substrate such as glass. For example, the substrate 102 or the substrate 202 may be architectural glass upon which electrochromic devices are fabricated. Architectural glass is glass that can be used as a building material. Architectural glass is typically used in commercial buildings, but may also be used in residential buildings, and typically, though not necessarily, separates an indoor environment from an outdoor environment. In certain embodiments, architectural glass is at least 20 inches by 20 inches. In some embodiments, architectural glass can be as large as about 72 inches by 120 inches.

As larger and larger substrates are used in electrochromic window applications, it becomes more desirable to reduce the number and extent of the defects in the electrochromic devices, otherwise performance and visual quality of the electrochromic windows may suffer. Certain embodiments described herein may reduce defectivity in electrochromic windows.

In some embodiments, one or more electrochromic devices are integrated into an insulating glass unit (IGU). An insulated glass unit comprises multiple panes (also referred to as "lites") with a spacer sealed between panes to form a sealed interior region that is thermally insulating and can contain a gas such as an inert gas. In some embodiments, an IGU includes multiple electrochromic lites, each lite having at least one electrochromic device.

In certain embodiments, an electrochromic device is fabricated by thin film deposition methods such as, e.g., sputter deposition, chemical vapor deposition, pyrolytic spray on technology and the like, including combinations of thin film deposition technologies known to one of ordinary skill in the art. In one embodiment, the electrochromic device is fabricated using all plasma vapor deposition.

In certain embodiments, an electrochromic device may further comprise one or more bus bars for applying voltage to the conductors of the electrochromic device. The bus bars are in electrical communication with a voltage source. The bus bars are typically located at one or more edges of the electrochromic device and not in the center region, for example, the viewable central area of an IGU. In some cases, the bus bars are soldered or otherwise connected to the first and second conductors to apply a voltage potential across the electrochromic stack. For example, ultrasonic soldering, which makes a low resistance connection, may be used. Bus bars may be, for example, silver ink based materials and/or include other metal or conductive materials such as graphite and the like.

II. Conductor and Other Electrochromic Device Materials

Recently, there has been increased attention paid to improving conductors for applications such as large-area electrochromic devices. Conventionally, single-layer conductors with transparent conductive oxides (TCOs) based on $In_2O_3$, ZnO, aluminum zinc oxide (AZO), fluorinated tin oxide (FTO), indium tin oxide (ITO) have been used, but advanced and/or large-area electrochromic devices require new conductors with lower resistivities than previously achieved, e.g., for faster switching speeds. A TCO/metal/TCO three-layer structure can serve as an alternative since it may provide superior electrical characteristics to that of a conventional single-layer conductor and may have improved optical properties. However, improvements are still needed with regards to this structure. For example, incorporating a TCO/metal/TCO three-layer structure into advanced electrochromic devices introduces problematic issues such as addressing optical and material compatibility with other layers of the advanced electrochromic devices. Generally speaking, recent advancements in electrochromic device design have necessitated improvements in conductors compatible with these advanced designs.

In some embodiments, electrochromic devices are configured not only for faster switching, but also to take into account the need for high quality, low-defect count electrochromic devices. In some cases, the electrochromic device conductors are configured for faster switching relative conventional single-layer TCO conductors, while also being optically and materially compatible with the other device layers.

The conductors described herein generally include one or more metal layers or one or more TCO layers, and in some embodiments, include both one or more metal layers and one or more TCO layers. The conductors having two or more layers of differing composition are sometimes referred to herein as "composite conductors" or "multi-layer conductors." In some cases, a composite conductor has two or more metal layers of differing composition. In other cases, a composite conductor has one or more metal layers and one or more TCO layers. In yet other cases, a composite conductor has two or more TCO layers. Generally, but not necessarily, the TCO materials used in conductors are high band gap metal oxides.

Some examples of TCO materials used in a TCO layer of a conductor include, but are not limited to, fluorinated tin oxide (FTO), indium tin oxide (ITO), aluminum zinc oxide (AZO) and other metal oxides, doped with one or more dopants or not, for example. In some cases, the TCO layer is between about 200 nm and 500 nm thick. In some cases, the TCO layer is between about 100 nm and 500 nm thick. In some cases, the TCO layer is between about 10 nm and 100 nm thick. In some cases, the TCO layer is between about 10 nm and 50 nm thick. In some cases, the TCO layer is between about 200 nm and 500 nm thick. In some cases, the TCO layer is between about 100 nm and 250 nm thick.

Some examples of metals used in a metal layer of a conductor include, but are not limited to, silver, copper, aluminum, gold, platinum, and mixtures, intermetallics and alloys thereof. In one embodiment, the metal layer has a thickness in the range of between about 1 nm and 5 nm thick. In one embodiment, the metal layer has a thickness in the range between about 5 nm to about 30 nm. In one embodiment, the metal layer has a thickness in the range between about 10 nm and about 25 nm. In one embodiment, the metal layer has a thickness in the range between about 15 nm and about 25 nm.

In some embodiments, a metal layer of a conductor may be comprised of a "metal sandwich" construction of two or more different metal sublayers. For example, a metal layer may comprise a "metal sandwich" construction of Cu/Ag/Cu sublayers instead of a single layer of, for example, Cu. In another example, a metal layer may comprise a "metal sandwich" construction of NiCr/metal/NiCr, where the metal sublayer is one of the aforementioned metals.

In some embodiments, a metal layer of a conductor comprises a metal alloy. Electromigration resistance of metals can be increased through alloying. Increasing the electromigration resistance of metal layers in a conductor reduces the tendency of the metal to migrate into the electrochromic stack and potentially interfere with operation of the device. By using a metal alloy, the migration of metal into the electrochromic stack can be slowed and/or reduced which can improve the durability of the electrochromic device. Certain aspects pertain to using a metal alloy in a metal layer of a conductor to help reduce the tendency of migration of the metal into the electrochromic stack and potentially improve the durability of the electrochromic device. For example, addition of small amounts of Cu or Pd to silver can substantially increase the electromigration resistance of the silver material. In one embodiment, for example, a silver alloy with Cu or Pd is used in a conductor to reduce the tendency of migration of silver into the electrochromic stack to slow down or prevent such migration from interfering with normal device operation. In some cases, the metal layer may be comprised of an alloy whose oxides have low resistivity. In one example, the metal layer may further comprise another material (e.g., Hg, Ge, Sn, Pb, As, Sb, or Bi) as compound during the preparation of the oxide to increase density and/or lower resistivity.

In some embodiments, the one or more metal layers of a composite conductor are transparent. Typically, a transparent metal layer is less than 10 nm thick, for example, about 5 nm thick or less. In other embodiments, the one or more metal layers of a composite conductor are opaque or not entirely transparent.

In certain embodiments, a composite conductor includes a layer of material of "opposing susceptibility" adjacent a dielectric or metal layer. A material of "opposing susceptibility," referring to the material's electric susceptibility, generally refers to a material that has susceptibility to having an opposing sign. Electric susceptibility of a material refers to its ability to polarize in an applied electric field. The greater the susceptibility, the greater the ability of the material to polarize in response to the electric field. Including a layer of "opposing susceptibility" can change the wavelength absorption characteristics to increase the transparency of the dielectric or metal layer and/or shift the wavelength transmitted through the combined layers. For example, a composite conductor can include a high-index dielectric material layer (e.g., $TiO_2$) of "opposing susceptibility" adjacent a metal layer to increase the transparency of the metal layer. In some cases, the added layer of opposing susceptibility" adjacent a metal layer can cause a not entirely transparent metal layer to be more transparent. For example, a metal layer (e.g., silver layer) that has a thickness in the range of from about 5 nm to about 30 nm, or between about 10 nm and about 25 nm, or between about 15 nm and about 25 nm, may not be entirely transparent by itself, but when coated with a material of "opposing susceptibility" (e.g., $TiO_2$ layer on top of the silver layer), the transmission through the combined layers is higher than the metal or dielectric layer alone. Certain aspects pertain to selecting a dielectric or metal layer and an adjacent layer of "opposing susceptibility" to color tune the electrochromic device to transmit certain wavelengths of a desired spectrum.

In certain embodiments, a composite conductor includes one or more metal layers and one more "color tuning" layers also referred to as "index matching" layers. These color tuning layers are generally of a high-index, low-loss dielectric material of "opposing susceptibility" to the one or more metal layers. Some examples of materials that can be used in "color tuning" layers include silicon oxide, tin oxide, indium tin oxide, and the like. In these embodiments, the thickness and/or material used in the one or more color tuning layers changes the absorption characteristics to shift the wavelength transmitted through the combination of the material layers. For example, the thickness of the one or more color tuning layers can be selected to tune the color of light transmitted through the electrochromic device in a bleached state to a desired spectrum (e.g., more blue over green or red). In another example, tuning layers are chosen and configured to reduce transmission of certain wavelengths (e.g., yellow) through the electrochromic device, and thus e.g. a window which includes the device coating.

Although the first and second composite conductors generally have the same or substantially similar layers and the order of the layers in the first composite conductor mirrors the order of the layers of the second composite conductor in described implementations, the disclosure is not so limiting. For example, the first composite conductor may have different layers than the second composite conductor in other embodiments. As another example, the first composite conductor may have the same layers as the second composite conductor but the order of the layers may not mirror each other.

In certain embodiments, the first and second conductors have matched sheet resistance, for example, to provide optimum switching efficiency of the electrochromic device and/or a symmetric coloration front. Matched conductors have sheet resistances that vary from each other by no more than 20% in some embodiments, in other embodiments by no more than 10%, and in yet other embodiments by no more than 5%.

For large-area electrochromic devices, e.g., those devices disposed on architectural scale substrates, that is, substrates at least 20×20 inches and up to 72×120 inches, the overall sheet resistance of each of the multi-layer conductors (including all layers of the conductor such as metal, TCO, and DMIL, if present) is typically less than 15Ω/□, less than 10Ω/□, less than 5Ω/□, less than 3Ω/□, or less than 2Ω/□. This allows for faster switching relative to conventional devices, particularly when the sheet resistance is less than 5Ω/□, or less than 3Ω/□, or less than 2Ω/□. Resistivities of conductors described herein are typically measured in Ω-cm. In one example, the resistivity of one or more of the multi-layer conductors may be between about 150 Ω-cm and about 500 Ω-cm. One or more of the layers of a multi-layer conductor, such as a metal layer, may have a lower resistivity.

Ideally, at least the lower conductor's topography should be smooth for better conformal layers in the deposited stack thereon. In certain embodiments, one or both of the conductors is a substantially uniform conductor layer that varies by about ±10% in thickness in some cases, or about ±5% in thickness in some cases, or even about ±2% in thickness in some cases. Although typically the thickness of conductors is about 10-800 nm, the thickness will vary depending upon the materials used, thickness of individual layers and how many layers are in the conductor. For example, for composite conductors that include one or more TCOs, the TCO components can be between about 50 nm and about 500 nm thick while the conductor also includes one or more metal layers. In one example, the thickness of the metal layer(s) is in the range of between about 0.1 nm and about 5 nm thick. In one example, the thickness of the metal layer(s) is in the range of between about 1 nm and about 5 nm thick. In one example, the thickness of the metal layer(s) is in the range of about 5 nm to about 30 nm. In one example, the thickness of the metal layer(s) is in the range of between about 10 nm and about 25 nm. In one example, the thickness of the metal layer(s) is in the range of or between about 15 nm and about 25 nm.

In certain cases, the one or more metal layers of a conductor are fabricated sufficiently thin so as to be transparent in a transmissive electrochromic device. In other cases, a metal layer of a conductor is fabricated sufficiently thin to be almost transparent and then a material of "opposing susceptibility" is disposed adjacent the almost transparent metal to increase the transparency of the metal layer in transmissive electrochromic device. In cases with reflective devices, the one or more metal layers may have non-transparent metal layers without adding an adjacent layer of material of "opposing susceptibility."

Electrochromic devices described herein may include one or more defect mitigating insulating layers (DMILs) such as those described in U.S. patent application Ser. No. 13/763, 505, titled "DEFECT MITIGATION LAYERS IN ELECTROCHROMIC DEVICES" and filed on Feb. 8, 2013, which is hereby incorporated by reference in its entirety. DMIL technology includes devices and methods employing the addition of at least one DMIL. A DMIL prevents electronically conducting layers and/or electrochromically active layers from contacting layers of the opposite polarity and creating a short circuit in regions where certain types of defects form. In some embodiments, a DMIL can encapsulate particles and prevent them from ejecting from the electrochromic stack and possibly cause a short circuit when subsequent layers are deposited. In certain embodiments, a DMIL has an electronic resistivity of between about 1 and $5 \times 10^{10}$ Ohm-cm.

In certain embodiments, a DMIL contains one or more of the following metal oxides: cerium oxide, titanium oxide, aluminum oxide, zinc oxide, tin oxide, silicon aluminum oxide, tungsten oxide, nickel tungsten oxide, tantalum oxide, and oxidized indium tin oxide. In certain embodiments, a DMIL contains a nitride, carbide, oxynitride, or oxycarbide such as nitride, carbide, oxynitride, or oxycarbide analogs of the listed oxides, e.g., silicon aluminum oxynitride. As an example, the DMIL may include one or more of the following metal nitrides: titanium nitride, aluminum nitride, silicon nitride, and tungsten nitride. The DMIL may also contain a mixture or other combination of oxide and nitride materials (e.g., a silicon oxynitride).

The general attributes of a DMIL include transparency in the visible range, weak or no electrochromism, electronic resistance comparable to or higher than that of undoped electrode material (electrochromic and/or counter electrode), and physical and chemical durability. In certain embodiments, the DMIL has a density of at most about 90% of the maximum theoretical density of the material from which it is fabricated.

As discussed above, one of the properties of a DMIL is its electronic resistivity. Generally, a DMIL should have an electronic resistivity level that is substantially greater than that of the transparent conductive layer in the conductor, and in certain cases orders of magnitude greater. In some embodiments, the material of a DMIL has an electronic resistivity that is intermediate between that of a conventional ion conducting layer and that of a transparent conductive layer (e.g., indium doped tin oxide). In some cases, the material of a DMIL has an electronic resistivity is greater than about $10^{-4}$ Ω-cm (approximate resistivity of indium tin oxide). In some cases, the material of a DMIL has an electronic resistivity is greater than about $10^{-6}$ Ω-cm. In some cases, a DMIL has an electronic resistivity between about $10^{-4}$ Ω-cm and $10^{14}$ Ω-cm (approximate resistivity of a typical ion conductor for electrochromic devices). In some cases, the material of a DMIL has an electronic resistivity between about $10^{-5}$ Ω-cm and $10^{12}$ Ω-cm. In certain embodiments, the electronic resistivity of the material in the DMIL is between about 1 and $5 \times 10^{13}$ Ω-cm. In certain embodiments, the electronic resistivity of the material in the DMIL is between about $10^2$ and $10^{12}$ Ω-cm. In certain embodiments, the electronic resistivity of the material in the DMIL is between about $10^6$ and $5 \times 10^{12}$ Ω-cm. In certain embodiments, the electronic resistivity of the material in the DMIL is between about $10^7$ and $5 \times 10^9$ Ω-cm. In some embodiments, the material in the DMIL will have a resistivity that is comparable (e.g., within an order of magnitude) of that of the material of the electrochromic layer or the counter electrode layer of the electrochromic stack.

The electronic resistivity is coupled to the thickness of the DMIL. This resistivity and thickness level will together yield a sheet resistance value which may in fact be more important than simply the resistivity of the material alone (a thicker material will have a lower sheet resistance). When using a material having a relatively high resistivity value, the electrochromic device may be designed with a relatively thin DMIL, which may be desirable to maintain the optical quality of the device. In certain embodiments, the DMIL has a thickness of about 100 nm or less or about 50 nm or less. In one example, the DMIL has a thickness of about 5 nm, in another example, the layer has a thickness of about 20 nm, and in another example, the layer has a thickness of about 40 nm. In certain embodiments, the DMIL has a thickness of between about 10 nm and about 100 nm. In one case, a DMIL is about 50 nm thick. In certain embodiments, the electronic sheet resistance of the DMIL is between about 40 and 4000Ω per square or between about 100 and 1000Ω per square. In some cases, the insulating material is electrically semiconducting having a sheet resistance that cannot be easily measured.

In certain embodiments, particularly those in which a DMIL is disposed on the substrate, a thicker layer of a DMIL is sometimes employed. The thickness of the DMIL may be, for example, between about 5 and 500 nm, between about 5 and 100 nm, between 10 and 100 nm, between about 15 and 50 nm, between about 20 and 50 nm, or between about 20 and 40 nm.

In certain embodiments, the material making up the DMIL has a relatively low charge capacity. In the context of an electrochromic device, a material's charge capacity represents its ability to reversibly accommodate lithium ions during normal electrochromic cycling. Charge capacity is the capacity of the material to irreversibly accommodate lithium ions that it encounters during fabrication or during initial cycling. Those lithium ions that are accommodated as charge are not available for subsequent cycling in and out of the material in which they are sequestered. If the insulating material of the DMIL has a high charge capacity, then it may serve as a reservoir of nonfunctional lithium ions (typically the layer does not exhibit electrochromism so the lithium ions that pass into it do not drive a coloring or bleaching transition). Therefore, the presence of this additional layer requires additional lithium ions to be provided in the device simply to be taken up by this additional layer. This is of course a disadvantage, as lithium can be difficult to integrate into the device during fabrication. In certain embodiments, the charge capacity of the DMIL is between about 10 and 100 milliCoulomb/cm$^2$*um. In one example, the charge capacity of the DMIL is between about 30 and 60 milliCoulomb/cm$^2$. For comparison, the charge capacity of a typical nickel tungsten oxide electrochromic layer is approximately 120 milliCoulomb/cm$^2$*um. In certain embodiments, the charge capacity of a DMIL is between about 30 and 100 milliCoulomb/cm$^2$*um. In one example, the charge capacity of the DMIL is between about 100 and 110 milliCoulomb/cm$^2$*um. For comparison, the charge capacity of a typical nickel tungsten oxide electrochromic layer is typically less than about 100 milliCoulomb/cm$^2$*um.

In certain embodiments, the DMIL is ionically conductive. This is particularly the case if the layer is deposited before the counter electrode layer. In some of these embodiments, the DMIL has an ionic conductivity of between about $10^{-7}$ Siemens/cm and $10^{-12}$ Siemens/cm. In other of these embodiments, the DMIL has an ionic conductivity of between about $10^{-8}$ Siemens/cm and $10^{-11}$ Siemens/cm. In other of these embodiments, the DMIL has an ionic conductivity of between about between $10^{-9}$ Siemens/cm and $10^{-10}$ Siemens/cm.

In some implementations, the DMIL exhibits little or no electrochromism during normal operation. Electrochromism may be measured by applying a defined voltage change or other driving force and measuring the change in optical density or transmissivity of the device.

According to certain implementations, the material of the DMIL should have favorable optical properties. For example, the material of the DMIL should have a relatively low optical density such as, for example, an optical density below about 0.1 or an optical density below about 0.05. Additionally in certain cases, the material of the DMIL has a refractive index that matches that of adjacent materials in the stack so that it does not introduce significant reflection. The material should also adhere well to other materials adjacent to it in the electrochromic stack.

As discussed above, a DMIL can serve to encapsulate particles that deposit on the device during fabrication in certain embodiments. By encapsulating these particles, they are less likely to eject and potentially cause defects. In certain implementations, the fabrication operation that deposits the DMIL is performed immediately after or soon after the process operation or operations that likely introduces particles into the device. These implementations may be useful to improve encapsulating the particles and reduce defectivity in electrochromic devices. In certain implementations, thicker layers of DMILs are used. Using thicker DMILs may be particularly useful to increase encapsulating of particles and reduce defectivity in electrochromic devices.

Various insulating materials may be used in DMILs. Some of these insulating materials include various transparent metal oxides such as, for example, aluminum oxide, zinc oxide, tin oxide, silicon aluminum oxide, silicon oxide, cerium oxide, stoichiometric tungsten oxide (e.g., WO$_3$, wherein the ratio of oxygen to tungsten is exactly 3), variations of nickel tungsten oxide, and highly oxidized indium tin oxide (ITO). In some cases, the insulating material of the DMIL is selected from aluminum oxide, zinc oxide, silicon aluminum oxide, tantalum oxide, and nickel tungsten oxide (typically a non-electrochromic type). In addition, some nitrides, carbides, oxynitrides, oxycarbides, and fluorides having medium to high resistance and optical transparency can be used. For example, nitrides such as titanium nitride, tantalum nitride, aluminum nitride, silicon nitride, and/or tungsten nitride may be used. Further, carbides such as titanium carbide, aluminum carbide, tantalum carbide, silicon carbide, and/or tungsten carbide may be used. Oxycarbides and/or oxynitrides may also be used in certain embodiments. Unless otherwise specified, each of these compositions may be present in various stoichiometries or ratios of elements. For DMILs containing nickel and tungsten, the ratio of nickel to tungsten may be controlled such that relatively high ratios are employed. For example the Ni:W (atomic) ratio may be between about 90:10 and 50:50 or between about 80:20 and 60:40.

In some cases, the material chosen for the DMIL is a material that integrates well (i.e. compatible) with electrochromic stack. The integration may be promoted by (a) employing compositions similar to those of materials in layers adjacent to DMIL in the stack (promotes ease of fabrication), and (b) employing materials that are optically compatible with the other materials in the stack and reduce quality degradation in the overall stack.

In certain embodiments, the electrochromic device includes a diffusion barrier between the lower conductor and the transparent substrate (e.g., a glass substrate such as soda lime glass). The diffusion barrier may include one or more layers. The diffusion barrier layer or layers keep sodium ions from diffusing into the electrochromic device layers above it and may also, optionally, be optically tuned to enhance various optical properties of the entire construct, e.g., % optical transmission (% T), haze, color, reflection and the like.

In one embodiment, the diffusion barrier includes one or more layers including one more of, for example, silicon dioxide, silicon oxide, tin oxide, FTO and the like. In certain aspects, the diffusion barrier is a three-layer stack of SiO$_2$, SnO$_2$, and SiO$_x$, wherein the SiO$_2$ layer has a thickness in the range of between 20 nm and 30 nm, the a SnO$_2$ layer has a thickness in the range of between 20 and 30 nm, and the SiO$_x$ layer has a thickness in the range of 2 nm to 10 nm. In one aspect, the SiO$_x$ layer of the tri-layer diffusion barrier is a monoxide or a mix of the monoxide with SiO$_2$. In one aspect, the tri-layer diffusion barrier may be sandwiched between an FTO and the substrate. In certain aspects, the diffusion barrier is in a bi-layer or tri-layer construction of SnO$_2$, SiO$_2$ and SiO$_x$ in various combinations. In one embodiment, thicknesses of individual diffusion barrier layers may be in the range between about 10 nm and 30 nm. In certain cases, thicknesses of individual diffusion barrier layers may be in the range of 20 nm-30 nm. In some cases, the diffusion barrier may be a sodium diffusion barrier and/or an anti-reflection or anti-iridescent layer.

In certain implementations, the electrochromic device has a diffusion barrier between the lower conductor and the substrate. In other implementations, the electrochromic device does not have a diffusion barrier. In some cases, a diffusion barrier may not be necessary and is not used. For example, if the substrate is a sodium free substrate such as plastic or alkali free glass, the diffusion barrier is optional. In other examples, an electrochromic device may have one or more color tuning layers over the substrate that function as a diffusion barrier.

III. Composite Conductors Examples

This section includes examples of electrochromic devices having one or more composite conductors, according to embodiments. In certain implementations, the electrochromic stacks and other layers of the electrochromic devices described in this section may have similar characteristics to layers described in the sections above. For example, the layers of the electrochromic stacks described in this section may be similar in some respects to the layers described with reference to FIGS. 2A and 2B in Section I. As another example, the characteristics of the DMILs described in this section are described in detail in Section II.

Conductive Material/DMIL1/Conductive Material/DMIL2

In certain embodiments, a composite conductor comprises material layers with the order of: a first conductive material layer, a first DMIL adjacent the first conductive material layer, a second conductive material layer adjacent the first DMIL, and a second DMIL adjacent the second conductive material layer. In these embodiments, the first conductive material layer is a metal layer or a TCO layer and the second conductive material layer is a metal layer or a TCO layer. In certain examples, both the first and second conductive material layers are metal layers. In other examples, both the first and second conductive material layers are a TCO layers. In other examples, the first or second conductive material layer is a TCO layer and the other conductive material layer is a metal layer. An example of a composite conductor with material layers, in order, of: a first conductive material layer, a first DMIL, a second conductive material layer, and a second DMIL is shown in FIG. 3.

Figure 3:
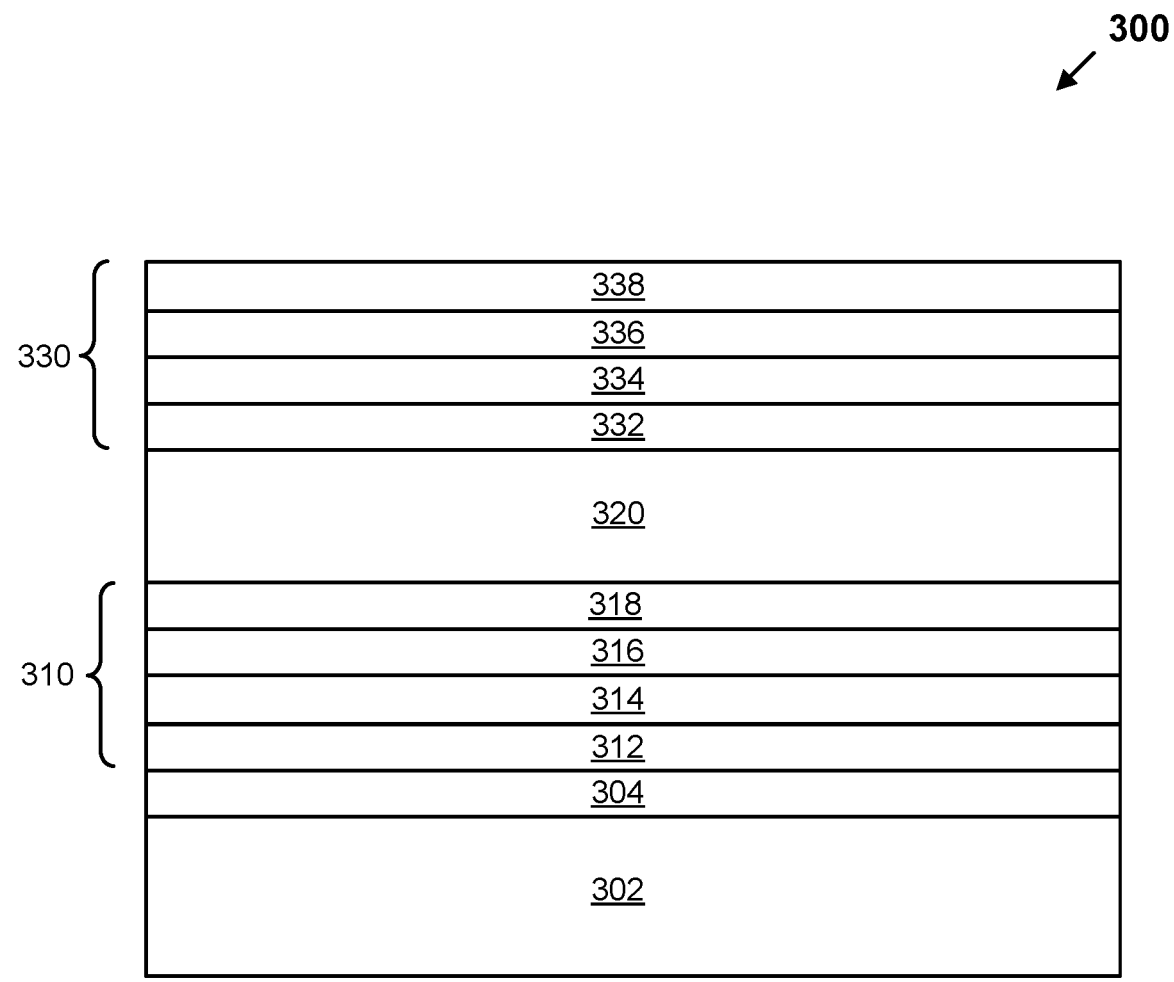
FIG. 3 depicts a schematic illustration of a cross section of an electrochromic device comprising in order a substrate, a diffusion barrier, a first composite conductor with a first conductive (metal or TCO) material layer, a first DMIL, a second conductive (metal or TCO) material layer, and a second DMIL and a second composite conductor with mirrored layers to first composite conductor, according to embodiments.

FIG. 3 depicts a schematic illustration of the material layers of an electrochromic device 300, according to embodiments. The electrochromic device 300 comprises a substrate 302, one or more diffusion barrier layers 304 disposed on the substrate 302, a first composite conductor 310 disposed on the diffusion barrier layer(s) 304, an electrochromic stack 320 disposed on the first composite conductor 310, and a second composite conductor 330 disposed on the electrochromic stack 320. The first composite conductor 310 comprises a first conductive material layer 312, a first DMIL 314, a second conductive material layer 316, and a second DMIL 318. The second composite conductor 330 comprises a third DMIL 314, a third conductive material layer 334, a fourth DMIL 336, and a fourth conductive material layer 338. The first conductive material layer 312 and the fourth conductive material layer 338 are either a metal layer or a TCO layer. The second conductive material layer 316 and the third conductive material layer 334 are either a metal layer or a TCO layer. In one example, the first conductive material layer 312 is a TCO layer and the second conductive material layer 316 is a metal layer. In another example, the first conductive material layer 312 is a metal layer and the second conductive material layer 316 is a TCO layer. In another example, both the first conductive material layer 312 and the second conductive material layer 316 are made of metal. In another example, both the first conductive material layer 312 and the second conductive material layer 316 are made of a TCO.

If the first conductive material layer 312 is made of a TCO, then the layer is made of any of the materials described above for TCOs and has the associated electrical, physical and optical properties of the TCO materials as described above. If the first conductive material layer 312 is made of a metal, then the layer may be made of any of the metal materials as described above for metal layers, including alloys, intermetallics, mixtures and/or layers of metals, and having the electrical, physical and optical properties of the metals as described above. In one embodiment where the first conductive material layer 312 is made of a metal, the thickness is between about 1 nm and 5 nm thick. In one embodiment where the first conductive material layer 312 is made of a metal, the thickness is between about 5 nm to about 30 nm. In one embodiment where the first conductive material layer 312 is made of a metal, the thickness is between about 10 nm and about 25 nm. In one embodiment where the first conductive material layer 312 is made of a metal, the thickness is between about 15 nm and about 25 nm. In one embodiment, the first conductive material layer 312 is made of a silver metal. The first DMIL 314 may be made of any of the materials described above for DMILs and has the associated electrical, physical and optical properties of the DMIL materials as described above. In one embodiment, the first DMIL 314 is of $TiO_2$. In one case, the first DMIL 314 of $TiO_2$ is between 10 nm and 100 nm thick. In another case, the first DMIL 314 of $TiO_2$ is between 25 nm and 75 nm thick. In another case, the first DMIL 314 of $TiO_2$ is between 40 nm and 60 nm thick. In yet another case, the first DMIL 314 of $TiO_2$ is about 50 nm thick.

If the second conductive material layer 316 is made of a TCO, then the layer is made of any of the materials described above for TCOs and has the associated electrical, physical and optical properties of the TCO materials as described above. If the second conductive material layer 316 is made of a metal, then the layer may be made of any of the metal materials as described above for metal layers, including alloys, intermetallics, mixtures and/or layers of metals, and having the electrical, physical and optical properties of the metals as described above. In one embodiment where the second conductive material layer 316 is made of a metal, the thickness is between about 1 nm and 5 nm thick. In one embodiment where the second conductive material layer 316 is made of a metal, the thickness is between about 5 nm to about 30 nm. In one embodiment where the second conductive material layer 316 is made of a metal, the thickness is between about 10 nm and about 25 nm. In one embodiment where the second conductive material layer 316 is made of a metal, the thickness is between about 15 nm and about 25 nm. In one embodiment, the second conductive material layer 316 is made of a silver metal.

The second DMIL 318 may be made of any of the materials described above for DMILs and has the associated electrical, physical and optical properties of the DMIL materials as described above. In one embodiment, the second DMIL 318 is of $TiO_2$. In one case, the second DMIL 318 of $TiO_2$ is between 10 nm and 100 nm thick. In another case, the second DMIL 318 of $TiO_2$ is between 25 nm and 75 nm thick. In another case, the second DMIL 318 of $TiO_2$ is between 40 nm and 60 nm thick. In yet another case, the second DMIL 318 of $TiO_2$ is about 50 nm thick.

The third DMIL 314 may be made of any of the materials described above for DMILs and has the associated electrical, physical and optical properties of the DMIL materials as described above. In one embodiment, the third DMIL 314 is of $TiO_2$. In one case, the third DMIL 314 of $TiO_2$ is between 10 nm and 100 nm thick. In another case, the third DMIL 314 of $TiO_2$ is between 25 nm and 75 nm thick. In another case, the third DMIL 314 of $TiO_2$ is between 40 nm and 60 nm thick. In yet another case, the third DMIL 314 of $TiO_2$ is about 50 nm thick.

The fourth DMIL 336 may be made of any of the materials described above for DMILs and has the associated electrical, physical and optical properties of the DMIL materials as described above. In one embodiment, fourth DMIL 336 is of $TiO_2$. In one case, fourth DMIL 336 of $TiO_2$ is between 10 nm and 100 nm thick. In another case, the fourth DMIL 336 of $TiO_2$ is between 25 nm and 75 nm thick. In another case, the fourth DMIL 336 of $TiO_2$ is between 40 nm and 60 nm thick. In yet another case, the fourth DMIL 336 of $TiO_2$ is about 50 nm thick.

If the third conductive material layer 334 is made of a TCO, then the layer is made of any of the materials described above for TCOs and has the associated electrical, physical and optical properties of the TCO materials as described above. If the third conductive material layer 334 is made of a metal, then the layer may be made of any of the metal materials as described above for metal layers, including alloys, intermetallics, mixtures and/or layers of metals, and having the electrical, physical and optical properties of the metals as described above. In one embodiment where the third conductive material layer 334 is made of a metal, the thickness is between about 1 nm and 5 nm thick. In one embodiment where the third conductive material layer 334 is made of a metal, the thickness is between about 5 nm to about 30 nm. In one embodiment where the third conductive material layer 334 is made of a metal, the thickness is between about 10 nm and about 25 nm. In one embodiment where the third conductive material layer 334 is made of a metal, the thickness is between about 15 nm and about 25 nm. In one embodiment, the third conductive material layer 334 is made of a silver metal.

If the fourth conductive material layer 338 is made of a TCO, then the layer is made of any of the materials described above for TCOs and has the associated electrical, physical and optical properties of the TCO materials as described above. If the fourth conductive material layer 338 is made of a metal, then the layer may be made of any of the metal materials as described above for metal layers, including alloys, intermetallics, mixtures and/or layers of metals, and having the electrical, physical and optical properties of the metals as described above. In one case, the fourth conductive material layer 338 is silver and is between about 1 nm and 5 nm thick. In one embodiment where the fourth conductive material layer 338 is made of a metal, the thickness is between about 1 nm and 5 nm thick. In one embodiment where the fourth conductive material layer 338 is made of a metal, the thickness is between about 5 nm to about 30 nm. In one embodiment where the fourth conductive material layer 338 is made of a metal, the thickness is between about 10 nm and about 25 nm. In one embodiment where the fourth conductive material layer 338 is made of a metal, the thickness is between about 15 nm and about 25 nm. In one embodiment, the fourth conductive material layer 338 is made of a silver metal.

In the illustrated embodiment, the first and second composite conductors 310 and 330 have the same or substantially similar material layers as each other with a mirrored layout. That is, the third DMIL 332 is the same or substantially similar to the second DMIL 318, the fourth DMIL 336 is the same or substantially similar to the first DMIL 314, the first conductive material layer 312 is the same or substantially similar to the fourth conductive material layer 338, and the second conductive material layer 316 is the same or substantially similar to the third conductive material layer 334. In other embodiments, the first and second composite conductors 310 and 330 may have different orders of the same layers. In yet other embodiments, the first and second composite conductors 310 and 330 have different material layers. Although the electrochromic device 300 is shown in with diffusion barrier layer(s) 304, another embodiment omits it.

In certain aspects, the first composite conductor 310 of the electrochromic device 300 shown in FIG. 3 further comprises one or more color tuning layers located between the substrate 302 and the first conductive material layer 312. In these aspects, the first conductive material layer 312 is made of metal. In some of these aspects, the color tuning layer(s) is substituted for the diffusion barrier 304. In these color tuning embodiments, the one or more color tuning layers may be selected to increase transparency of the conductor and/or to modify the wavelength of light passing through the electrochromic device to change the color of light transmitted. Some examples of materials that can be used in color tuning layers are silicon oxide, tin oxide, indium tin oxide, and the like.

Various Layers with "Opposing Susceptibility"

Figure 4:
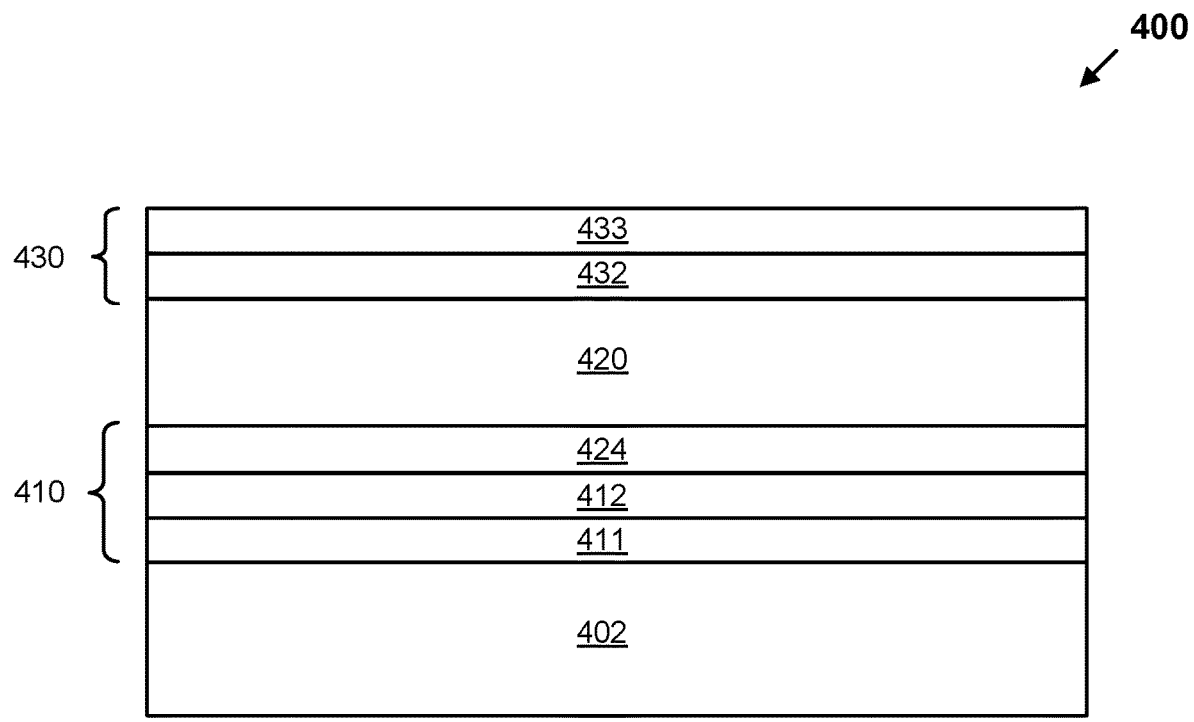
FIG. 4 depicts a schematic illustration of a cross section of an electrochromic device with a composite conductor having one or more color tuning layers, according to aspects.

In certain embodiments, the materials used in one or more of the diffusion barrier layer(s), color tuning layer(s) and DMIL layer(s) are selected based on "opposing susceptibility" to adjacent layers to increase the transparency of the electrochromic device and/or tune the wavelength of light transmitted through the electrochromic device to a desired spectrum. For example, the materials may be selected to transmit a range of wavelengths associated with blue light through the electrochromic device. In some cases, the materials are selected to shift the range of wavelengths away from green or red. An example of a construction of an electrochromic device with a composite conductor comprising one or more color tuning layers is shown in FIG. 4. In this example, the electrochromic device 400 does not have a separate diffusion barrier disposed on the substrate 402.

FIG. 4 depicts a schematic illustration of an electrochromic device 400 comprising a substrate 402, a first composite conductor 410 disposed on the substrate 402, an electrochromic stack 420 disposed on the first composite conductor 410, and a second composite conductor 430 disposed on the electrochromic stack 420. The first composite conductor 410 comprises one or more color tuning layers 411, a metal layer (e.g., silver) 412 disposed on the one or more color tuning layers 411, and a first DMIL (e.g., $TiO_2$) 424 disposed on the metal layer 412. The second composite conductor 420 comprises a second DMIL 432 disposed on the EC stack 420, and a second metal layer 433. In another embodiment, the order of the layers in either or both of the composite conductors 410 and 430 may be reversed.

In certain implementations, the second DMIL 432 is the same or substantially similar to the first DMIL 424 and/or the second metal layer 433 is the same or substantially similar to the first metal layer 412. In other embodiments, the first composite conductor 410 and/or the second composite conductor 430 have additional layers. For example, one or more color tuning layers may be added to the second composite conductor 430. As another example, a diffusion barrier may be added between the one or more color tuning layers 411 and the substrate 402.

The one or more color tuning layers 411 is made of any of the materials described above for color tuning layers. The first metal layer 412 is made of any of the metal materials as described above for metal layers, including alloys, intermetallics, mixtures and/or layers of metals, and having the electrical, physical and optical properties of the metals as described above. In one embodiment, the first metal layer 412 has a thickness in a range of between about 1 nm and about 5 nm. In one embodiment, the first metal layer 412 has a thickness in a range of between about 5 nm and about 30 nm. In one embodiment, the first metal layer 412 has a thickness in a range of between about 10 nm and about 25 nm. In one embodiment, the first metal layer 412 has a thickness in a range of between about 15 nm and about 25 nm. In one embodiment, the first metal layer 412 is made of silver.

The first DMIL 424 may be made of any of the materials described above for DMILs and has the associated electrical, physical and optical properties of the DMIL materials as described above. In one embodiment, the first DMIL 424 is of $TiO_2$. In one case, first DMIL 424 of $TiO_2$ is between 10 nm and 100 nm thick. In another case, the first DMIL 424 of $TiO_2$ is between 25 nm and 75 nm thick. In another case, the first DMIL 424 of $TiO_2$ is between 40 nm and 60 nm thick. In yet another case, the first DMIL 424 of $TiO_2$ is about 50 nm thick.

The second metal layer 433 is made of any of the metal materials as described above for metal layers, including alloys, intermetallics, mixtures and/or layers of metals, and having the electrical, physical and optical properties of the metals as described above. In one embodiment, the second metal layer 433 is silver, for example, having a thickness between about 1 nm and 5 nm thick. In one embodiment, the second metal layer 433 has a thickness between about 1 nm and about 5 nm thick. In one embodiment, the second metal layer 433 has a thickness between about 5 nm and about 30 nm. In one embodiment, the second metal layer 433 has a thickness between about 10 nm and about 25 nm. In one embodiment, the second metal layer 433 has a thickness between about 15 nm and about 25 nm.

The second DMIL 432 may be made of any of the materials described above for DMILs and has the associated electrical, physical and optical properties of the DMIL materials as described above. In one embodiment, the second DMIL 432 is of $TiO_2$. In one case, second DMIL 432 of $TiO_2$ is between 10 nm and 100 nm thick. In another case, the second DMIL 432 of $TiO_2$ is between 25 nm and 75 nm thick. In another case, the second DMIL 432 of $TiO_2$ is between 40 nm and 60 nm thick. In yet another case, the second DMIL 432 of $TiO_2$ is about 50 nm thick.

In certain embodiments, one or more of the layers of materials describe herein can serve multiple functions. For example, in one embodiment, a layer disposed on the substrate function both as a diffusion barrier and an opposite susceptibility layer. Also, a layer can function both as a DMIL layer and an opposite susceptibility layer.

DMIL Between TCO/Metal/TCO Conductor and Electrochromic Stack

In certain embodiments, an electrochromic device has a lower composite conductor comprising a TCO (e.g., ITO)/Metal/TCO (e.g., ITO) stack also referred to as an "IMI stack" and a DMIL (e.g., $TiO_2$) between the IMI stack and the electrochromic stack. An example of such an electrochromic device is shown in FIG. 5. In these embodiments, the DMIL layer may improve durability of the electrochromic device. There may be a DMIL between each IMI, of two, and an EC stack that is sandwiched therebetween, that is, IMI/DMIL/EC stack/DMIL/IMI, optionally with color tuning and/or diffusion barrier layers between that structure and the substrate.

Figure 5A:
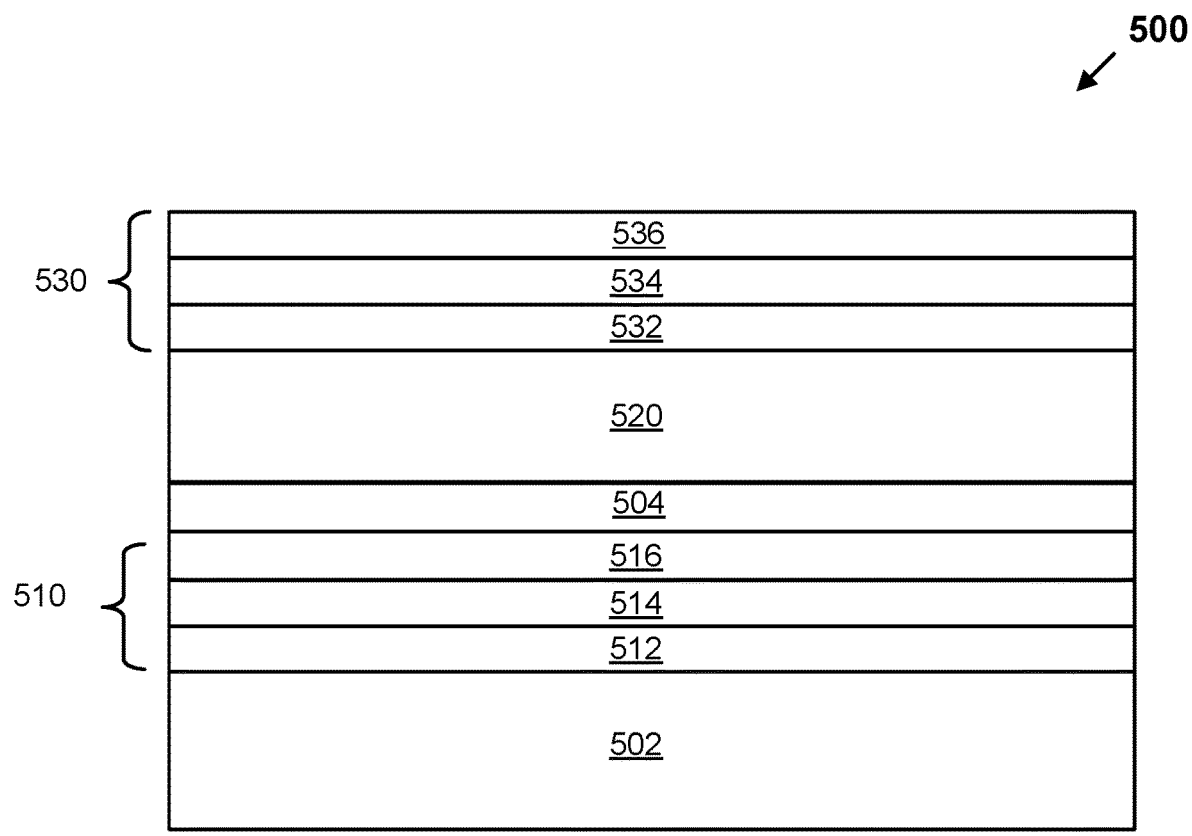
FIG. 5A depicts a schematic illustration of a cross section of an electrochromic device with a composite conductor having a DMIL between a TCO/Metal/TCO stack and the electrochromic stack, according to aspects.
Figure 5B:
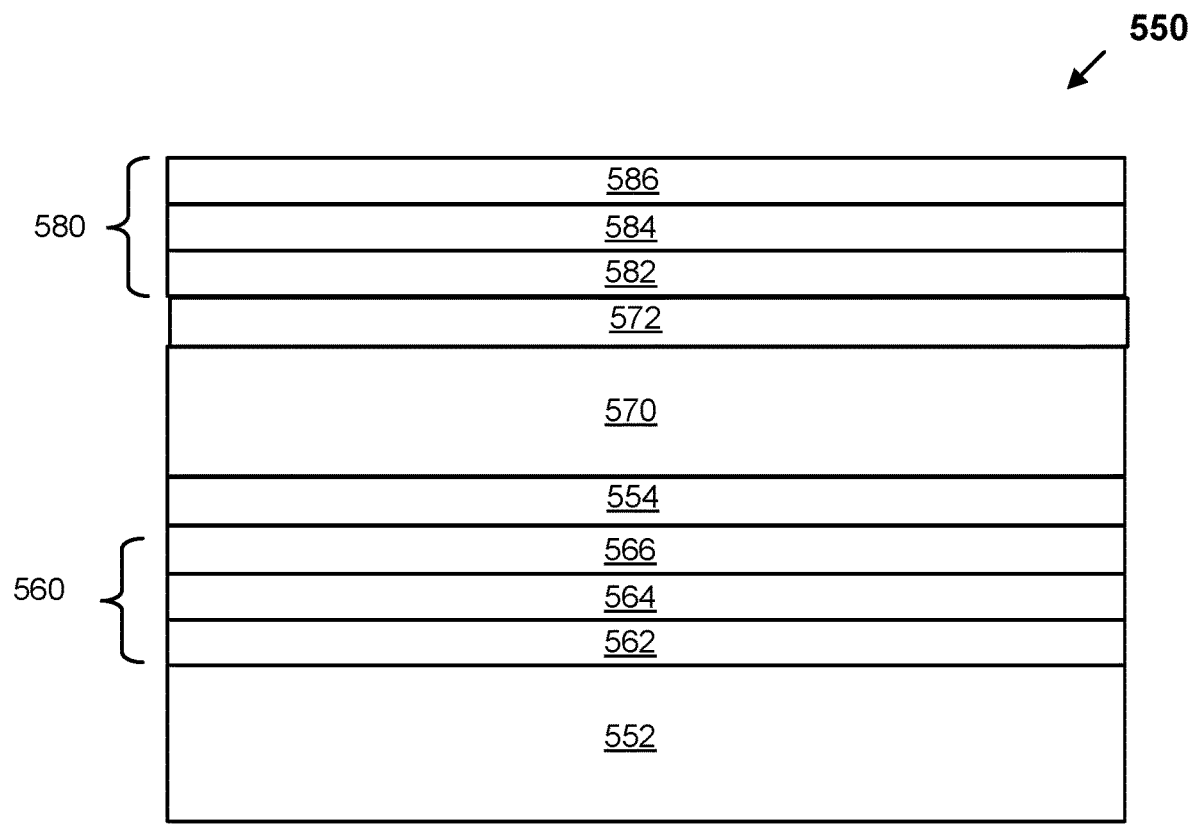
FIG. 5B depicts a schematic illustration of a cross section of an electrochromic device with a composite conductor having a DMIL between a TCO/Metal/TCO stack and the electrochromic stack, according to aspects.

FIG. 5A depicts a schematic illustration of an electrochromic device 500 comprising a substrate 502, a first composite conductor 510 disposed on the substrate 502, a DMIL 504 disposed on the first composite conductor 510, an electrochromic stack 520 disposed on the DMIL 504, and a second composite conductor 530 disposed on the electrochromic stack 520. The first composite conductor 510 comprises a first TCO layer 512 disposed on the substrate 502, a first metal layer (e.g., silver) 514 disposed on the first TCO layer 512, and a second TCO layer 516 disposed on the first metal layer 514. The second composite conductor 530 comprises a third TCO layer 532 disposed on the electrochromic stack 520, a second metal layer (e.g., silver) 534 disposed on the third TCO layer 532, and a fourth TCO layer 536 disposed on the second metal layer 534. Another embodiment also includes a second DMIL between EC stack and the third TCO layer as shown in FIG. 5B.

In one implementation, the first and second composite conductors 510 and 530 have the same or substantially similar material layers in a mirrored arrangement. That is, the fourth TCO 536 is the same or substantially similar to the first TCO layer 512, the third TCO layer 532 is the same or substantially similar to the second TCO layer 516, and the first metal layer 514 is the same or substantially similar to the second metal layer 534. In other embodiments, the first and second composite conductors 510 and 530 may have different orders of the same layers. In yet other embodiments, the first and second composite conductors 510 and 530 may have one more different material layers. In certain aspects, the first composite conductor 510 and/or the second composite conductor 530 have one or more color tuning layers.

The first TCO layer 512 is made of any of the materials described above for TCOs and has the associated electrical, physical and optical properties of the TCO materials as described above. In one embodiment, the first TCO layer 512 is a FTO layer between about 200 nm and 500 nm thick. The first metal layer (e.g., silver) 514 is made of any of the metal materials as described above for metal layers, including alloys, intermetallics, mixtures and/or layers of metals, and having the electrical, physical and optical properties of the metals as described above. In one embodiment, the first metal layer 514 is silver. In one embodiment, the first metal layer 514 has a thickness in the range of about 1 nm and about 5 nm. In one embodiment, the first metal layer 514 has a thickness in the range of about 5 nm to about 30 nm. In one embodiment, the first metal layer 514 has a thickness in the range of about 10 nm and about 25 nm. In one embodiment, the first metal layer 514 has a thickness in the range of about 15 nm and about 25 nm.

The second TCO layer 516 is made of any of the materials described above for TCOs and has the associated electrical, physical and optical properties of the TCO materials as described above. In one embodiment, the second TCO layer 516 is a FTO layer between about 200 nm and 500 nm thick. The third TCO layer 532 is made of any of the materials described above for TCOs and has the associated electrical, physical and optical properties of the TCO materials as described above. In one embodiment, the third TCO layer 532 is a FTO layer between about 200 nm and 500 nm thick. The second metal layer 534 is made of any of the metal materials as described above for metal layers, including alloys, intermetallics, mixtures and/or layers of metals, and having the electrical, physical and optical properties of the metals as described above. In one embodiment, the second metal layer 534 is silver. In one embodiment, the second metal layer 534 has a thickness in the range of between about 1 nm and about 5 nm thick. In one embodiment, the second metal layer 534 has a thickness in the range of between about 5 nm to about 30 nm. In one embodiment, the second metal layer 534 has a thickness in the range of between about 10 nm and about 25 nm. In one embodiment, the second metal layer 534 has a thickness between about 15 nm and about 25 nm.

The fourth TCO layer 536 is made of any of the materials described above for TCOs and has the associated electrical, physical and optical properties of the TCO materials as described above. In one embodiment, the fourth TCO layer 536 is a FTO layer between about 200 nm and 500 nm thick. The first DMIL 504 may be made of any of the materials described above for DMILs and has the associated electrical, physical and optical properties of the DMIL materials as described above. In one embodiment, the first DMIL 504 is of $TiO_2$. In one case, the first DMIL 504 of $TiO_2$ is between 10 nm and 100 nm thick. In another case, the first DMIL 504 of $TiO_2$ is between 25 nm and 75 nm thick. In another case, the first DMIL 504 of $TiO_2$ is between 40 nm and 60 nm thick. In yet another case, the first DMIL 504 of $TiO_2$ is about 50 nm thick.

FIG. 5B depicts a schematic illustration of an electrochromic device 500 comprising a substrate 552, a first composite conductor 560 disposed on the substrate 552, a first DMIL 554 disposed on the first composite conductor 550, an electrochromic stack 570 disposed on the first DMIL 554, a second DMIL 572 disposed on the electrochromic stack 520, and a second composite conductor 580 disposed on the second DMIL 572. The first composite conductor 560 comprises a first TCO layer 562 disposed on the substrate 552, a first metal layer (e.g., silver) 564 disposed on the first TCO layer 562, and a second TCO layer 566 disposed on the first metal layer 564. The second composite conductor 580 comprises a third TCO layer 582 disposed on the second DMIL 572, a second metal layer (e.g., silver) 584 disposed on the third TCO layer 582, and a fourth TCO layer 586 disposed on the second metal layer 584.

In one implementation, the first and second composite conductors 560 and 580 have the same or substantially similar material layers in a mirrored arrangement. That is, the fourth TCO 586 is the same or substantially similar to the first TCO layer 562, the third TCO layer 532 is the same or substantially similar to the second TCO layer 566, and the first metal layer 564 is the same or substantially similar to the second metal layer 584. In other embodiments, the first and second composite conductors 560 and 580 may have different orders of the same layers. In yet other embodiments, the first and second composite conductors 560 and 580 may have one more different material layers. In certain aspects, the first composite conductor 560 and/or the second composite conductor 580 have one or more color tuning layers.

The first TCO layer 562 is made of any of the materials described above for TCOs and has the associated electrical, physical and optical properties of the TCO materials as described above. In one embodiment, the first TCO layer 562 is a FTO layer between about 200 nm and 500 nm thick. The first metal layer (e.g., silver) 564 is made of any of the metal materials as described above for metal layers, including alloys, intermetallics, mixtures and/or layers of metals, and having the electrical, physical and optical properties of the metals as described above. In one embodiment, the first metal layer 564 is silver. In one embodiment, the first metal layer 564 has a thickness in the range of about 1 nm and about 5 nm. In one embodiment, the first metal layer 564 has a thickness in the range of about 5 nm to about 30 nm. In one embodiment, the first metal layer 564 has a thickness in the range of about 10 nm and about 25 nm. In one embodiment, the first metal layer 564 has a thickness in the range of about 15 nm and about 25 nm.

The second TCO layer 570 is made of any of the materials described above for TCOs and has the associated electrical, physical and optical properties of the TCO materials as described above. In one embodiment, the second TCO layer 570 is a FTO layer between about 200 nm and 500 nm thick. The third TCO layer 582 is made of any of the materials described above for TCOs and has the associated electrical, physical and optical properties of the TCO materials as described above. In one embodiment, the third TCO layer 582 is a FTO layer between about 200 nm and 500 nm thick. The second metal layer 584 is made of any of the metal materials as described above for metal layers, including alloys, intermetallics, mixtures and/or layers of metals, and having the electrical, physical and optical properties of the metals as described above. In one embodiment, the second metal layer 584 is silver. In one embodiment, the second metal layer 584 has a thickness in the range of between about 1 nm and about 5 nm thick. In one embodiment, the second metal layer 584 has a thickness in the range of between about 5 nm to about 30 nm. In one embodiment, the second metal layer 584 has a thickness in the range of between about 10 nm and about 25 nm. In one embodiment, the second metal layer 584 has a thickness between about 15 nm and about 25 nm.

The fourth TCO layer 586 is made of any of the materials described above for TCOs and has the associated electrical, physical and optical properties of the TCO materials as described above. In one embodiment, the fourth TCO layer 586 is a FTO layer between about 200 nm and 500 nm thick. The first DMIL 584 may be made of any of the materials described above for DMILs and has the associated electrical, physical and optical properties of the DMIL materials as described above. In one embodiment, the first DMIL 584 is of $TiO_2$. In one case, the first DMIL 584 of $TiO_2$ is between 10 nm and 100 nm thick. In another case, the first DMIL 584 of $TiO_2$ is between 25 nm and 75 nm thick. In another case, the first DMIL 584 of $TiO_2$ is between 40 nm and 60 nm thick. In yet another case, the first DMIL 584 of $TiO_2$ is about 50 nm thick.

The second DMIL 572 may be made of any of the materials described above for DMILs and has the associated electrical, physical and optical properties of the DMIL materials as described above. In one embodiment, the second DMIL 572 is of $TiO_2$. In one case, the second DMIL 572 of $TiO_2$ is between 10 nm and 100 nm thick. In another case, the second DMIL 572 of $TiO_2$ is between 25 nm and 75 nm thick. In another case, the second DMIL 572 of $TiO_2$ is between 40 nm and 60 nm thick. In yet another case, the second DMIL 572 of $TiO_2$ is about 50 nm thick. In one embodiment, the second DMIL 572 has the same characteristics of first DMIL 554.

Barrier/Blocking Layer(s)

In certain embodiments, an electrochromic device includes one or more barrier or blocking layers disposed between the lower conductor and the electrochromic stack to help prevent diffusion of metal into the electrochromic stack. Some examples of materials that can be used in such barrier or blocking layers are tantalum nitride, titanium nitride, silicon nitride, silicon oxynitride and the like, which can serve to block migration of silver from the lower conductor into the electrochromic stack. Titanium nitride and tantalum nitride, e.g., are particularly good barrier layers to prevent metal migration. An example of an electrochromic device with one or more barrier or blocking layers disposed between the lower conductor and the electrochromic stack is shown in FIG. 6.

Figure 6:
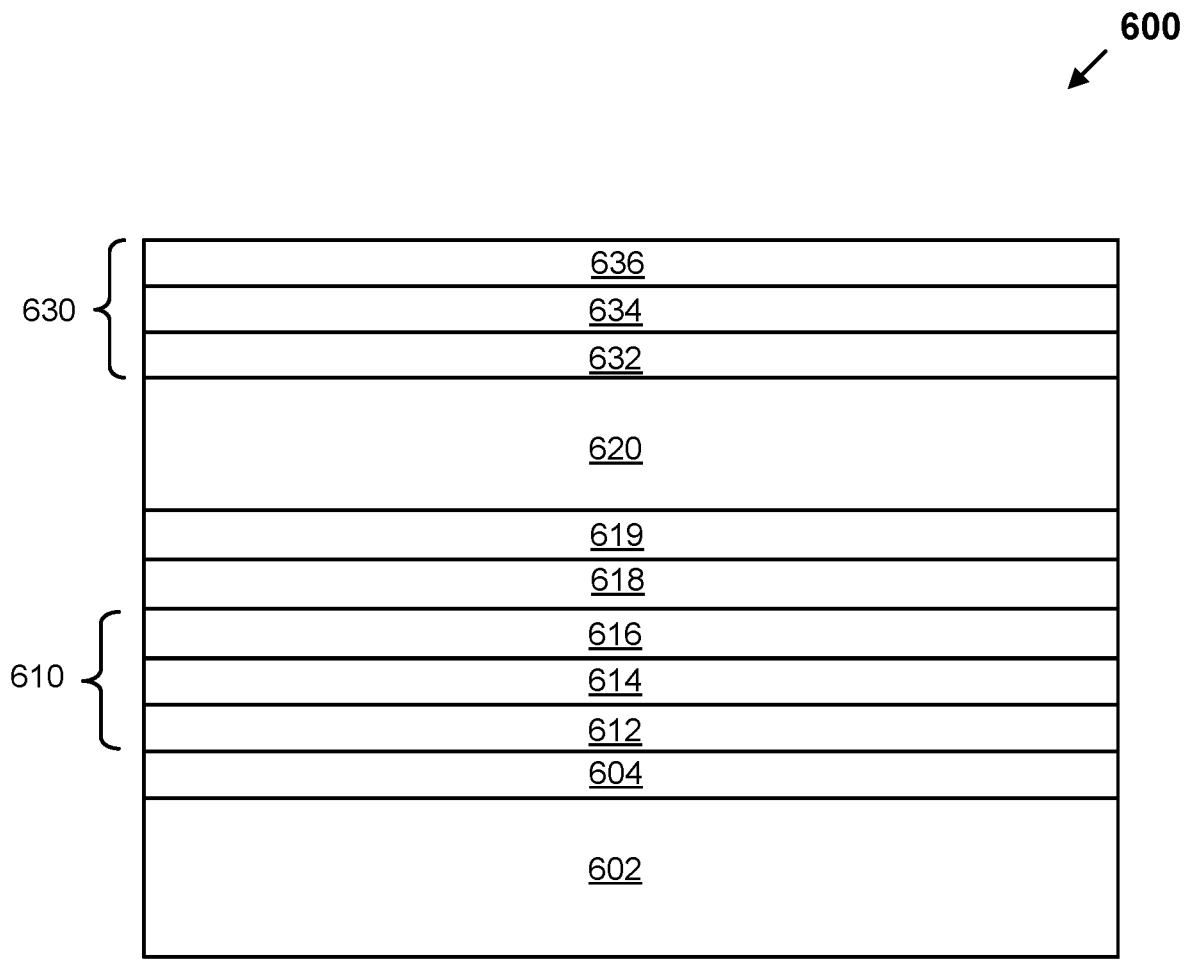
FIG. 6 depicts a schematic illustration of a cross section of an electrochromic device with one or more barrier/blocking layer, according to aspects.

FIG. 6 depicts a schematic illustration of an electrochromic device 600, according to embodiments. The electrochromic device 600 comprises a substrate 602, one or more diffusion barrier layers 604 disposed on the substrate 602, a first composite conductor 610 disposed on the diffusion barrier layer(s) 604, one or more barrier/blocking layers 618 (e.g., material layers of TaN or TiN) disposed on the first composite conductor 610, a first DMIL 619 (e.g., TiO$_2$) disposed on the one or more barrier/blocking layers 618, an electrochromic stack 620 disposed on the first DMIL 619, and a second composite conductor 630 disposed on the electrochromic stack 620. The first composite conductor 610 comprises a first TCO layer 612 (e.g., ITO layer) disposed on the one or more diffusion barrier layers 604, a first metal layer 614 (e.g., silver layer) disposed on the first TCO layer 612, and a second TCO layer 616 disposed on the first metal layer 614. The second composite conductor 630 comprises a third TCO layer 632 disposed on electrochromic stack 620, a second metal layer 634 disposed on the third TCO layer 632, and a fourth TCO layer 636 disposed on the second metal layer 634. The one or more barrier/blocking layers 618 are between the first DMIL 619 and the second TCO layer 616 to provide a barrier for diffusion into the electrochromic stack 620. For example, if the metal layer 614 is a silver layer and the one or more barrier/blocking layers 618 comprise TaN or TiN, then the TaN or TiN barrier/blocking layers 618 can block migration of silver into the electrochromic stack 620.

The first TCO layer 612 is made of any of the materials described above for TCOs and has the associated electrical, physical and optical properties of the TCO materials as described above. In one embodiment, the first TCO layer 612 is a FTO layer between about 200 nm and 500 nm thick. The first metal layer 614 is made of any of the metal materials as described above for metal layers, including alloys, intermetallics, mixtures and/or layers of metals, and having the electrical, physical and optical properties of the metals as described above. In one embodiment, the first metal layer 614 is silver. In one embodiment, the first metal layer 614 has a thickness in the range of between about 1 nm and 5 nm thick. In one embodiment, the first metal layer 614 has a thickness in the range of between about is about 5 nm to about 30 nm. In one embodiment, the first metal layer 614 has a thickness in the range of between about 10 nm and about 25 nm. In one embodiment, the first metal layer 614 has a thickness in the range of between about 15 nm and about 25 nm.

The second TCO layer 616 is made of any of the materials described above for TCOs and has the associated electrical, physical and optical properties of the TCO materials as described above. In one embodiment, the second TCO layer 616 is a FTO layer between about 200 nm and 500 nm thick. The third TCO layer 632 is made of any of the materials described above for TCOs and has the associated electrical, physical and optical properties of the TCO materials as described above. In one embodiment, the third TCO layer 632 is a FTO layer between about 200 nm and 500 nm thick. The second metal layer 634 is made of any of the metal materials as described above for metal layers, including alloys, intermetallics, mixtures and/or layers of metals, and having the electrical, physical and optical properties of the metals as described above. In one embodiment, the second metal layer 634 is silver. In one embodiment, the second metal layer 634 has a thickness in the range of between about 1 nm and 5 nm thick. In one embodiment, the second metal layer 634 has a thickness in the range of between about 5 nm and about 30 nm. In one embodiment, the second metal layer 634 has a thickness in the range of between about 10 nm and about 25 nm. In one embodiment, the second metal layer 634 has a thickness in the range of between about 15 nm and about 25 nm.

The fourth TCO layer 636 is made of any of the materials described above for TCOs and has the associated electrical, physical and optical properties of the TCO materials as described above. In one embodiment, the fourth TCO layer 636 is a FTO layer between about 200 nm and 500 nm thick. The barrier/blocking layers 618 is made of materials described above for barrier/blocking layers and has all the associated electrical, physical and optical properties of the barrier/blocking layers. The first DMIL 619 may be made of any of the materials described above for DMILs and has the associated electrical, physical and optical properties of the DMIL materials as described above. In one embodiment, the first DMIL 619 is of TiO$_2$. In one case, the first DMIL 619 of TiO$_2$ is between 10 nm and 100 nm thick. In another case, the first DMIL 619 of TiO$_2$ is about 50 nm thick. In one case, the first DMIL 619 of TiO$_2$ is between 10 nm and 100 nm thick. In another case, the first DMIL 619 of TiO$_2$ is between 25 nm and 75 nm thick. In another case, the first DMIL 619 of TiO$_2$ is between 40 nm and 60 nm thick. In yet another case, the first DMIL 619 of TiO$_2$ is about 50 nm thick.

In one implementation, the first and second composite conductors 610 and 630 have the same or substantially similar material layers with the illustrated mirrored layout. That is, the first TCO layer 612 is the same or substantially similar to the fourth TCO layer 636, the first metal layer 614 is the same or substantially similar to the second metal layer 634, and the second TCO layer is the same or substantially similar to the third TCO layer 632. In other embodiments, the first and second composite conductors may have different orders of the same layers. In yet other embodiments, the first and second composite conductors may have one more different material layers. In certain implementations, the electrochromic device 600 omits the diffusion barrier 604. In certain aspects, the first and/or second composite conductor 610, 630 of the electrochromic device 600 shown in FIG. 6 further comprises one or more color tuning layers adjacent the metal layers.

Protective Cap

In certain embodiments, an electrochromic device includes a protective cap layer on top of a key conductive layer (e.g., metal layer) to protect it from being damaged during one or more fabrication operations. For example, a key conductive layer may be of aluminum, which is readily oxidized to aluminum oxide during fabrication operations such as those that include high temperature such as a heat treatment process. Oxidation of an aluminum conductive layer can make it a poor conductor, particularly if the aluminum layer is thin. Certain aspects pertain to fabricating a protective cap layer, such as a titanium protective cap layer, over the aluminum conductive layer to protect it during fabrication. Using titanium metal as a protective cap layer has the benefit that the titanium oxidized to TiO$_2$, which generates a DMIL layer while simultaneously protecting the underlying aluminum from oxidation.

Figure 7:
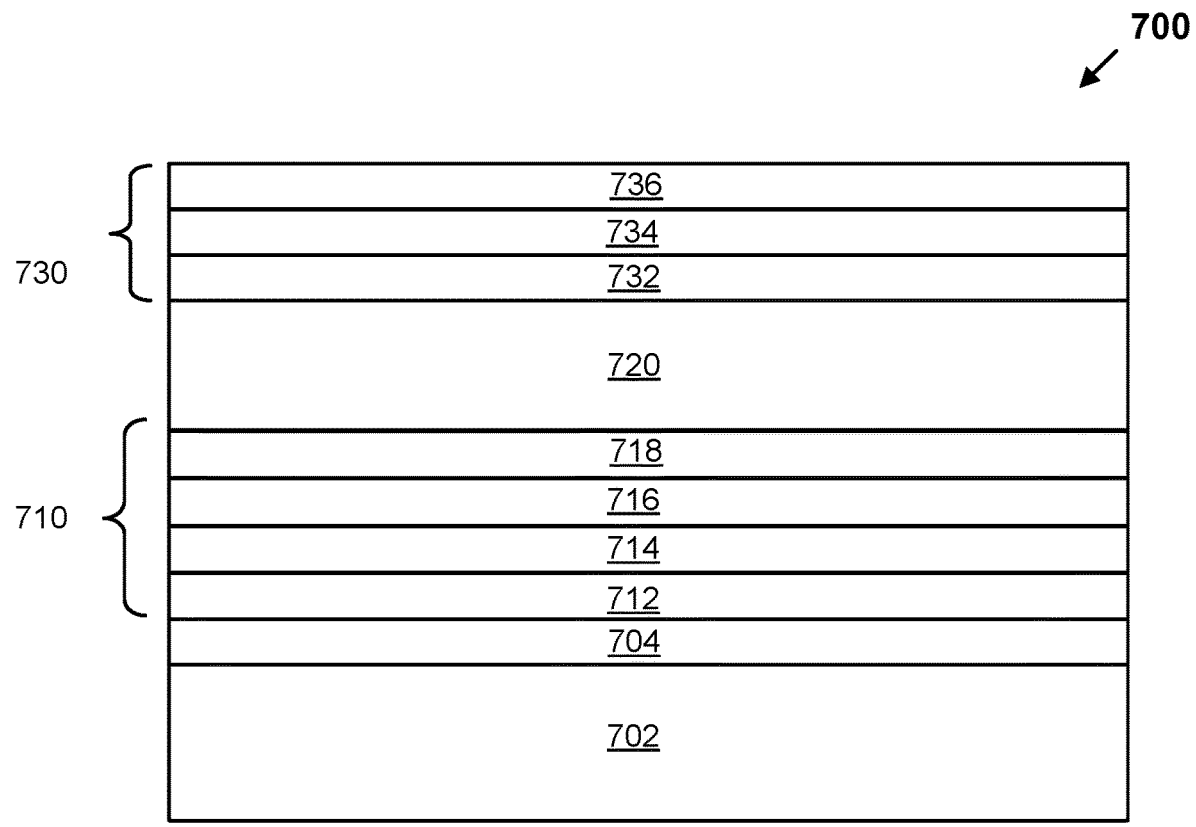
FIG. 7 depicts a schematic illustration of a cross section of an electrochromic device with a protective cap, according to aspects.

FIG. 7 depicts a schematic illustration of an electrochromic device 700 comprising a substrate 702, one or more diffusion barrier layers 704 disposed on the substrate 702, a first composite conductor 710 disposed on the diffusion barrier layer(s) 704, an electrochromic stack 720 disposed on the first composite conductor 710, and a second composite conductor 730 disposed on the electrochromic stack 720. The first composite conductor 710 comprises a first TCO layer 712 disposed on the one or more diffusion barrier layers 704, a first metal layer (e.g., silver) 714 disposed on the first TCO layer 712, a protective cap layer 716 disposed on the first metal layer 714, and a second TCO layer 718 disposed on the protective cap layer 716. If the protective cap layer is of material such as titanium that oxidizes to generate a DMIL during a fabrication operation, then a DMIL layer (not shown) may be formed at the interface to the second TCO 718. The second composite conductor 530 comprises a third TCO layer 732 disposed on the electrochromic stack 720, a second metal layer (e.g., silver) 734 disposed on the third TCO layer 732, and a fourth TCO layer 736 disposed on the second metal layer 734.

The first TCO layer 712 is made of any of the materials described above for TCOs and has the associated electrical, physical and optical properties of the TCO materials as described above. In one embodiment, the first TCO layer 712 is a FTO layer between about 200 nm and 500 nm thick. The first metal layer 714 is made of any of the metal materials as described above for metal layers, including alloys, intermetallics, mixtures and/or layers of metals, and having the electrical, physical and optical properties of the metals as described above. In one embodiment, the first metal layer 714 is silver. In one embodiment, the first metal layer 714 has a thickness in the range of between about 1 nm and 5 nm thick. In one embodiment, the first metal layer 714 has a thickness in the range of between about 5 nm and about 30 nm. In one embodiment, the first metal layer 714 has a thickness in the range of between about 10 nm and about 25 nm. In one embodiment, the first metal layer 714 has a thickness in the range of between about 15 nm and about 25 nm.

The protective cap layer 716 may be made of any of the materials described above for protective cap materials and has the associated electrical, physical and optical properties of the protective cap materials as described above. The second TCO layer 718 is made of any of the materials described above for TCOs and has the associated electrical, physical and optical properties of the TCO materials as described above. In one embodiment, the second TCO layer 718 is a FTO layer between about 200 nm and 500 nm thick. The third TCO layer 732 is made of any of the materials described above for TCOs and has the associated electrical, physical and optical properties of the TCO materials as described above. In one embodiment, the third TCO layer 732 is a FTO layer between about 200 nm and 500 nm thick. The second metal layer 734 is made of any of the metal materials as described above for metal layers, including alloys, intermetallics, mixtures and/or layers of metals, and having the electrical, physical and optical properties of the metals as described above. In one embodiment, the second metal layer 734 is silver. In one embodiment, the second metal layer 734 has a thickness in the range of between about 1 nm and 5 nm thick. In one embodiment, the second metal layer 734 has a thickness in the range of between about 5 nm and about 30 nm. In one embodiment, the second metal layer 734 has a thickness in the range of between about 10 nm and about 25 nm. In one embodiment, the second metal layer 734 has a thickness in the range of between about 15 nm and about 25 nm.

The fourth TCO layer 736 is made of any of the materials described above for TCOs and has the associated electrical, physical and optical properties of the TCO materials as described above. In one embodiment, the fourth TCO layer 736 is a FTO layer between about 200 nm and 500 nm thick.

In one implementation, the first and second composite conductors 710 and 730 have the same or substantially similar material layers in a mirrored arrangement. That is, the fourth TCO 736 is the same or substantially similar to the first TCO layer 712, the third TCO layer 732 is the same or substantially similar to the second TCO layer 716, and the first metal layer 714 is the same or substantially similar to the second metal layer 734. In other embodiments, the first and second composite conductors 710 and 730 may have different orders of the same layers. In yet other embodiments, the first and second composite conductors 710 and 730 may have one more different material layers. In certain aspects, the first composite conductor 710 and/or the second composite conductor 740 have one or more color tuning layers.

Other Examples of Multi-Layer Lower Conductors

Figure 8:
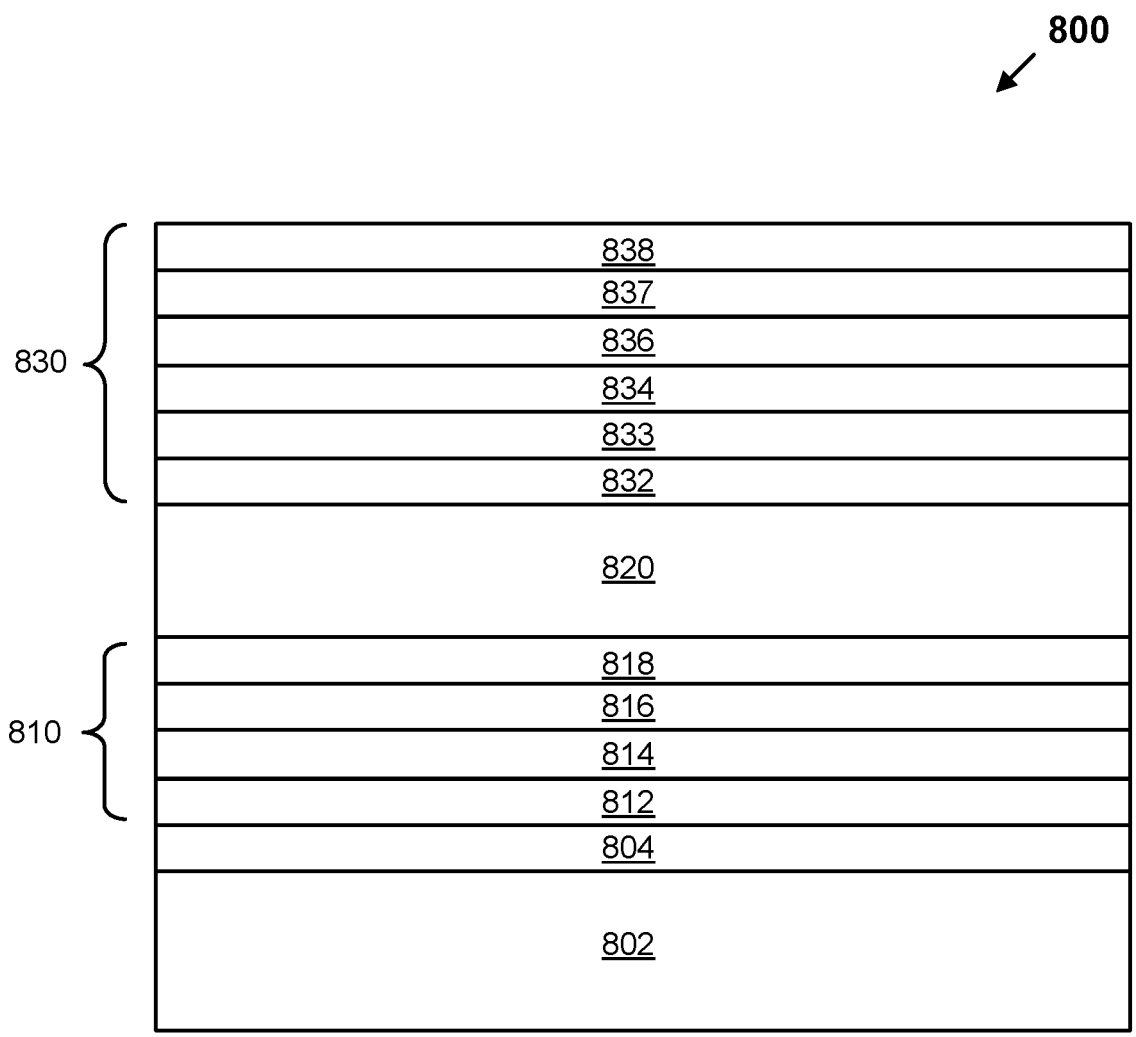
FIG. 8 depicts a schematic illustration of a cross section of an electrochromic device with multi-layer conductors, according to embodiments.

FIG. 8 is an example used to illustrate various other embodiments of multi-layer conductors. FIG. 8 depicts a schematic illustration of the material layers of an electrochromic device 800, according to embodiments. The electrochromic device 800 comprises a substrate 802, one or more diffusion barrier layers 804 disposed on the substrate 802, a first composite conductor 810 disposed on the diffusion barrier layer(s) 804, an electrochromic stack 820 disposed on the first composite conductor 810, and a second composite conductor 830 disposed on the electrochromic stack 820. The first composite conductor 810 comprises a first TCO layer 812 disposed over the one or more diffusion barrier layers 804, a first DMIL 814 disposed over the first TCO layer 812, a first metal layer 816 disposed over the first DMIL 814, and a second DMIL 818 disposed over the first metal layer 816. The second composite conductor 830 comprises an optional third DMIL 832 shown disposed over the electrochromic stack 820, a second TCO 833 disposed over the third DMIL 832, a second metal layer 834 disposed over the second TCO 833, a third TCO 836 disposed over the second metal layer 834, an optional third metal layer 837 disposed over the third TCO 836, and an optional fourth TCO 838 disposed over the third metal layer 837.

In certain aspects, the first composite conductor 810 of the electrochromic device 800 shown in FIG. 8 further comprises one or more color tuning layers located adjacent one or more of the metal layers. In these color tuning embodiments, the one or more color tuning layers may be selected to increase transparency of the conductor and/or to modify the wavelength of light passing through the electrochromic device to change the color of light transmitted. Some examples of materials that can be used in color tuning layers are silicon oxide, tin oxide, indium tin oxide, and the like.

The first TCO layer 812 is made of any of the materials described above for TCOs and has the associated electrical, physical and optical properties of the TCO materials as described above. In one embodiment, the first TCO layer 812 is a FTO layer between about 200 nm and 500 nm thick.

The first DMIL 814 may be made of any of the materials described above for DMILs and has the associated electrical, physical and optical properties of the DMIL materials as described above. In one embodiment, the first DMIL 814 is of $TiO_2$. In one case, the first DMIL 814 of $TiO_2$ is between 10 nm and 100 nm thick. In another case, the first DMIL 814 of $TiO_2$ is between 25 nm and 75 nm thick. In another case, the first DMIL 814 of $TiO_2$ is between 40 nm and 60 nm thick. In yet another case, the first DMIL 814 of $TiO_2$ is about 50 nm thick.

The first metal layer 816 is made of any of the metal materials as described above for metal layers, including alloys, intermetallics, mixtures and/or layers of metals, and having the electrical, physical and optical properties of the metals as described above. In one embodiment, the first metal layer 816 is silver. In one embodiment, the first metal layer 816 has a thickness in the range of between about 1 nm and 5 nm thick. In one embodiment, the first metal layer 816 has a thickness in the range of between about 5 nm and about 30 nm. In one embodiment, the first metal layer 816 has a thickness in the range of between about 10 nm and about 25 nm. In one embodiment, the first metal layer 816 has a thickness in the range of between about 15 nm and about 25 nm.

A function of the second DMIL 818 is to prevent metal from the first metal layer 816 from migrating and exposure to the electrochromic stack 820. For example, the electrochromic device 800 may be lithium, proton or other ion based in some cases. Such electrochromic devices undergo oxidation/reduction reactions at their electrode layers. The second DMIL 818 protects the first metal layer 816 from oxidation and reduction reactions, particularly oxidation. The second DMIL 818 can be made of any of the materials described above for DMILs and has the electrical, physical and optical properties of DMILs as described above. In one embodiment, the second DMIL 818 is $TiO_2$. In one case, the second DMIL 818 of $TiO_2$ is between 10 nm and 100 nm thick. In another case, the second DMIL 818 of $TiO_2$ is between 25 nm and 75 nm thick. In another case, the second DMIL 818 of $TiO_2$ is between 40 nm and 60 nm thick. In yet another case, the second DMIL 818 of $TiO_2$ is about 50 nm thick.

The third DMIL 832 is an optional layer. The third DMIL 832 may function to prevent the second TCO layer 833 from exposure to the electrochromic stack 820 and/or may function as a traditional DMIL. In one embodiment, the third DMIL 832 is NiWO and is between about 10 nm and about 100. In another embodiment, the third DMIL 832 is NiWO and is between about 10 nm and about 50 nm thick.

The second TCO layer 833 may be made of any of the materials described above for TCOs and has the associated electrical, physical and optical properties of the TCO materials as described above. In one embodiment, the second TCO layer 833 is ITO and is between about 10 nm and about 100 nm thick. In one embodiment, the second TCO layer 833 is ITO and is between about 25 nm and about 75 nm thick. In one embodiment, the second TCO layer 833 is ITO and is about 50 nm thick.

The second metal layer 834 is made of any of the metal materials as described above for metal layers, including alloys, intermetallics, mixtures and/or layers of metals, and having the electrical, physical and optical properties of the metals as described above. In one embodiment, the second metal layer 834 is silver. In one embodiment, the second metal layer 834 has a thickness in the range of between about 1 nm and 5 nm thick. In one embodiment, the second metal layer 834 has a thickness in the range of between about 5 nm and about 30 nm. In one embodiment, the second metal layer 834 has a thickness in the range of between about 10 nm and about 25 nm. In one embodiment, the second metal layer 834 has a thickness in the range of between about 15 nm and about 25 nm.

The third TCO layer 836 may be made of any of the materials described above for TCOs and has the associated electrical, physical and optical properties of the TCO materials as described above. In one embodiment, the third TCO layer 836 is ITO and is between about 50 nm and about 500 nm thick. In one embodiment, the third TCO layer 836 is ITO and is between about 100 nm and about 500 nm thick. In one embodiment, the third TCO layer 836 is ITO and is between about 100 nm thick and about 250 nm thick.

The third metal layer 837 is optional. If this third metal layer 837 is included, then the optional fourth TCO layer 838 is also included. The third metal layer 837 is made of any of the metal materials as described above for metal layers, including alloys, intermetallics, mixtures and/or layers of metals, and having the electrical, physical and optical properties of the metals as described above. In one embodiment, the third metal layer 837 is silver. In one embodiment, the third metal layer 837 has a thickness in the range of between about 1 nm and 5 nm thick. In one embodiment, the third metal layer 837 has a thickness in the range of between about 5 nm and about 30 nm. In one embodiment, the third metal layer 837 has a thickness in the range of between about 10 nm and about 25 nm. In one embodiment, the third metal layer 837 has a thickness in the range of between about 15 nm and about 25 nm.

The fourth TCO layer 838 is optional. If the fourth TCO layer 838 is included, then the third metal layer 837 is also included. The fourth TCO layer 838 may be made of any of the materials described above for TCOs and has the associated electrical, physical and optical properties of the TCO materials as described above. In one embodiment, the fourth TCO layer 838 is ITO and is between about 50 nm and about 500 nm thick. In one embodiment, the fourth TCO layer 838 is ITO and is between about 100 nm and about 500 nm thick. In one embodiment, the fourth TCO layer 838 is ITO and is between about 100 nm thick and about 250 nm thick.

In certain aspects, an electrochromic device comprises two conductors, at least one of which is a multi-layer conductor, and an electrochromic stack between the conductors, disposed on a substrate (e.g., glass). Each multi-layer conductor comprises a metal layer sandwiched between at least two non-metal layers such as, for example, a metal oxide layer, a transparent conductive oxide (TCO) layer and/or a DMIL. That is, a metal layer is not in direct contact with the electrochromic stack. In some cases, one or both of the conductors further comprises one or more additional metal layers. In these aspects, the additional metal layers are also sandwiched between layers and not in contact with the electrochromic stack. In some aspects, the one or more metal layers of a multi-layer conductor are not in contact with a TCO layer. For example, a metal layer of a multi-layer conductor may be sandwiched between two DMILs.

In certain aspects, a multi-layer conductor may comprise a metal layer sandwiched between a DMIL and a non-metal layer. In some cases, the sandwiched metal layer may comprise of one of silver, gold, copper, platinum, and alloys thereof. In some cases, the metal layer may be comprised of an alloy whose oxides have low resistivity. In one example, the metal layer may further comprise another material (e.g., Hg, Ge, Sn, Pb, As, Sb, or Bi) as compound during the preparation of the oxide to increase density and/or lower resistivity.

Layers of Multi-Layer Lower Conductors with Multiple Functions

In certain embodiments, one or more of the layers of materials described herein can serve multiple functions. For example, in one embodiment, a layer disposed on the substrate function both as a diffusion barrier and an opposite susceptibility layer. Also, a layer can function both as a DMIL layer and as an opposite susceptibility layer.

Although the foregoing embodiments have been described in some detail to facilitate understanding, the described embodiments are to be considered illustrative and not limiting. It will be apparent to one of ordinary skill in the art that certain changes and modifications can be practiced within the scope of the above description and the appended claims.

What is claimed is:

1. An electrochromic device comprising, in the following order:
   a) a glass substrate;
   b) a first transparent conductive oxide layer;
   c) a first defect mitigating insulating layer;
   d) a first metal layer;
   e) a second defect mitigating insulating layer;
   f) an electrochromic stack comprising a cathodically-coloring electrode layer and an anodically-coloring electrode layer sandwiching an ion conductor layer;
   g) a second transparent conductive oxide layer;
   h) a second metal layer; and
   i) a third transparent conductive oxide layer.

2. The electrochromic device of claim 1, wherein the glass substrate is float glass and there is an ion diffusion barrier between the glass substrate and the first transparent conductive oxide layer.

3. The electrochromic device of claim 1, wherein the first transparent conductive oxide layer comprises fluorinated tin oxide.

4. The electrochromic device of claim 1, wherein the first and second metal layers comprise silver.

5. The electrochromic device of claim 1, wherein the second and third transparent conductive oxide layers comprise indium tin oxide.

6. The electrochromic device of claim 1, further comprising, in the following order:
   j) a third metal layer; and
   k) a fourth transparent conductive oxide layer.

7. The electrochromic device of claim 6, wherein the third metal layer comprises silver and the fourth transparent conductive oxide layer comprises indium tin oxide.

8. An electrochromic device comprising, in the following order:
   a substantially transparent substrate;
   a first multi-layer conductor disposed on the substantially transparent substrate, the first multi-layer conductor comprising, in order, one or more color tuning layers, a first metal layer, and a first defect mitigating insulating layer;
   an electrochromic stack; and
   a second multi-layer conductor disposed on the electrochromic stack, the second multi-layer conductor comprising, in order, a second defect mitigating insulating layer and a second metal layer.

9. The electrochromic device of claim 8, further comprising one or more diffusion barrier layers between the substantially transparent substrate and the first multi-layer conductor.

10. The electrochromic device of claim 8, wherein the first metal layer is transparent by virtue of being adjacent to the one or more color tuning layers.

11. The electrochromic device of claim 1, wherein all layers in b)-i) are disposed in order on the glass substrate.

* * * * *